(12) United States Patent  
Moss, II

(10) Patent No.: US 12,087,455 B2  
(45) Date of Patent: Sep. 10, 2024

(54) FUSION ENERGY DEVICE WITH GEODESIC DEVIATION GRAVITATIONAL EFFECTS

(71) Applicant: Samuel Pierre Moss, II, Williamsville, NY (US)

(72) Inventor: Samuel Pierre Moss, II, Williamsville, NY (US)

( * ) Notice: Subject to any disclaimer, the term of this patent is extended or adjusted under 35 U.S.C. 154(b) by 1278 days.

(21) Appl. No.: 16/136,432

(22) Filed: Sep. 20, 2018

(65) Prior Publication Data

US 2019/0088375 A1 Mar. 21, 2019

Related U.S. Application Data

(60) Provisional application No. 62/561,227, filed on Sep. 21, 2017.

(51) Int. Cl.
*G21B 1/05* (2006.01)
*H05H 1/10* (2006.01)
(Continued)

(52) U.S. Cl.
CPC .............. *G21B 1/052* (2013.01); *G21B 1/05* (2013.01); *H05H 1/10* (2013.01); *G21B 1/15* (2013.01); *G21B 1/17* (2013.01)

(58) Field of Classification Search
CPC . G21B 1/052; G21B 1/05; G21B 1/15; G21B 1/17; Y02E 30/10; H05H 1/10
See application file for complete search history.

(56) References Cited

U.S. PATENT DOCUMENTS

| | | | | |
|---|---|---|---|---|
| 5,517,083 A | * | 5/1996 | Whitlock | .......... H05H 1/02 |
| | | | | 313/153 |
| 2007/0113980 A1 | * | 5/2007 | Lindley | ........ H01J 37/32623 |
| | | | | 156/345.46 |

(Continued)

FOREIGN PATENT DOCUMENTS

CN  106026777 A  * 10/2016  ............... H02N 3/00

OTHER PUBLICATIONS

Clery, Daniel (Oct. 21, 2015), "The bizarre reactor that might save nuclear fusion", ScienceMag.org, downloaded Nov. 19, 2020. (Year: 2015).*

(Continued)

*Primary Examiner* — Lily C Garner
(74) *Attorney, Agent, or Firm* — Bond, Schoeneck & King, PLLC

(57) ABSTRACT

A fusion reactor with a spherical shaped confinement apparatus comprising a plurality of conductive coils that form a rotating negative potential well about a confined center at the center of the system, confining electrons expelled from a surrounding electron discharging grid to obtain a curved spherical rotation pattern to the electrons confined with in the confinement apparatus. The confinement apparatus is also rotated by a multipolar rotating electric machine to promote improved confinement by reducing the amount of time for electrons to escape confinement and shaping the particles in a more curved and spherical shape to allow converging and diverging geodesic effects to enhance tighter and denser particle confinement. This fusion concept reduces the amount of energy needed to operate while minimizing magnetic reconnection disturbances, allowing the NESAR to be the world's first reactor to meet the break-even point of fusion with possible gravitational effects.

18 Claims, 27 Drawing Sheets

(51) Int. Cl.
  *G21B 1/15* (2006.01)
  *G21B 1/17* (2006.01)

(56) References Cited

U.S. PATENT DOCUMENTS

| | | | |
|---|---|---|---|
| 2008/0187086 A1* | 8/2008 | Bussard | H05H 1/11 376/127 |
| 2010/0284501 A1* | 11/2010 | Rogers | G21B 1/17 376/107 |
| 2011/0170647 A1* | 7/2011 | Bussard | H05H 1/16 376/129 |
| 2015/0380114 A1* | 12/2015 | Park | G21B 1/05 376/144 |
| 2018/0068746 A1* | 3/2018 | Wong | G21B 1/13 |
| 2018/0114603 A1* | 4/2018 | Rogers | G21B 1/15 |
| 2020/0236770 A1* | 7/2020 | Zimmermann | G21B 3/008 |

OTHER PUBLICATIONS

Airapetian et al.; Magnetic Interaction of a Super-CME with the Earth's Magnetosphere: Scenario for Young Earth; arxiv:1410.7355v2; 2014; Retrieved from: https://arxiv.org/pdf/1410.7355.pdf, Jun. 2014.

R. Hull; the Farnsworth/Hirsch Fusor: How a Small Vacuum System and a Bit of Basketweaving Will Get You a Working Inertial-Electrostatic Confinement Neutron Source; From the Bell Jar, vol. 6, No. 3/4, Summer/Autumn 1997; Retrieved from: http://www.belljar.net/634fusor.pdf.

T. Ligon; The World's Simplest Fusion Reactor Revisited or the Not-Quite-So-Simple Fusion Reactor, and How They Made It Work; pp. 1-18; 2007; Retrieved from: http://www.fusor.net/files/EMC2_FusionToPost.pdf, Feb. 2008.

Beidler et al.; Nonlinear Modeling of Forced Magnetic Reconnection in Slab Geometry with NIMROD; AIP, Physics of Plasma, 24,052508; pp. 1-16; Apr. 18, 2017.

A. Kregar; University of Ljubljana Seminar Mar. 2011: Aharonov-Bohm Effect; pp. 1-14; Retrieved from: http://mafija.fmf.uni-lj.si/seminar/files/2010_2011/seminar_aharonov.pdf.

Titus et al.; ELM and In-Vessel Coil Programs at PPPL for ITER, DIII-D, and JET; 2010; pp. 1-14; Retrieved from: http://www.euro-fusionscipub.org/wp-content/uploads/2014/11/EFDC100828.pdf, Aug. 2010.

V. Igochine; PPPL Seminar Aug. 23, 2011; Sawtooth Crash and NTM Triggering in ASDEX Upgrade; pp. 1-24; Retrieved from: https://www.princeton.edu/plasmacenter/news-events/workshop/program/Igochine.pdf.

S. Reith; Navy Electricity and Electronics Training Series; NAVEDTRA 14177; Sep. 1998; pp. 1-120; Retrieved from: https://maritime.org/doc/neets/mod05.pdf.

* cited by examiner

FUSION ENERGY DEVICE WITH GEODESIC
DEVIATION GRAVITATIONAL EFFECTS

CROSS REFERENCE TO RELATED
APPLICATIONS

This application claims the benefit under 35 U.S.C. § 119(e) of U.S. Provisional Patent Application Ser. No. 62/561,227, filed on Sep. 21, 2017, which Application is incorporated herein in its entirety.

TECHNICAL FIELD

This invention is a confinement device that perpetuates fusion reactions with possible gravitational effects by producing a curved circular trajectory upon the particles within the created plasma allowing for much denser plasmas to be confined at a much lower amount of energy needed to confine them relative to other fusion reactors.

BACKGROUND

To date, the creation of a successful fusion device has not yet been developed that has the ability to reach or surpass the break-even point to be deemed as a viable alternate energy source. As such, many of the physicists that study in the field of plasma physics and fusion technology have directed the majority of their efforts in meeting this break-even point for fusion technology in the Tokamak method of creating fusion power.

The Fusor and Polywell are the only fusion devices that use injected hydrogen isotopes for ionization to create fusion reactions. The Fusor and Polywell inject, within a vacuum possessing a voltage, potential hydrogen isotopes. The neutral hydrogen isotopes are then ionized, accelerating the separated electrons or ions to the center of the system. Both of these systems have failed in coming close to meeting the break-even point of fusion.

The greatest difference between the Fusor and the Polywell are their configurations of the voltage potential, whether it is a cathode within an anode or conversely, the smashing and fusion of particles will occur to the center of the system. Currently, the preferred voltage potential used for most systems is to have a surrounding cathode (negatively charged) grid around an anode (positively charged) configuration. This type of voltage potential results in the acceleration of electrons to the center of the system which is used in Polywell type systems.

The reason that accelerating electrons have become the more preferred method in these types of magnetic confinement systems is because the less massive electrons take less energy to confine than the more heavy ions. As electrons are accelerated to the center of the system, they may be pushed outside of the inner confinement, but since each electron is much less massive than the ions they have a greater chance of being recirculated and reaccelerated back to the center of the system. This allows for the confinement of electrons to occur, eventually creating an electron negative potential well to the center of the system.

The Polywell has six ring shaped conductive coils configured and attached in the shape of a truncated cube, which creates a plurality of magnetic cusps for confining electrons. The confinement of these electrons will cause a negative potential well. Once a substantial amount of electrons are confined the negative potential well will then accelerate ions from the ionized hydrogen isotopes to the center of the system. The confinement of these electrons and ions create a neutral plasma, and it is within this plasma that ions fuse to perpetuate the fusion process.

The following is a list of a few disadvantages of known reactors including the Fusor and Polywell as it pertains to the invention described herein. Previous methods that utilize magnets for magnetic field confinement allow for particles to escape from the system more easily once enough outward pressure is created from the confined particles at the center of the system. Additionally, methods of confining the particles within conductive coils, without angled magnetic fields to perpetuate a pattern of movement throughout the created plasma, allows for particles to escape from the system. Furthermore, methods of confining the particles within the conductive coils without physically rotating the confining conductive coil arrangement allows for particles to escape the system more easily due to more confined particles interacting with each cusp's magnetic fields at an angle more closely parallel to the alignment of the cusp fields. The confined particles are in a plasma state of matter, which means that the plasma becomes the medium of travel for these particles. The velocity of these particles gradually reduce as the plasma becomes more dense, which allows for the physical rotation of the system to assist with the confinement process.

SUMMARY OF INVENTION

The instant application is drawn to a fusion energy device with geodesic deviation gravitational effects, or as it is also referred to herein, a Nuclear Electromagnetic Shaping Accelerator Reactor (NESAR). The NESAR is based upon numerous studies in plasma physics, electrical engineering, mechanical engineering, quantum theory, Albert Einstein's theories in relativity, and astronomy in the efforts to build a fusion reactor that resembles the ones that we already observe in nature, e.g., the stars.

The present invention solves these problems by configuring a conductive coil confinement system that uses more conductive coils closer to the shape of a rounded sphere to yield improved confinement of particles. This type of configuration of more magnetic fields would create more cusps; thus more evenly distributing the pressure created by the particles confined about a confined center within the confinement apparatus. The confined center is the middle point of the confined particles and plasma. This added uniformity to the distribution of pressure would reduce the escape of particles.

Furthermore, angling multiple confining magnetic fields slightly off-center towards the same general relative direction will form a rotating negative potential well that will promote a rotational pattern throughout the confined plasma. The collective of these magnetic forces will allow for particles to move in a curved rotation about one relative confined center in the shape of a sphere that will allow for converging geodesic effects to enhance confinement. This type of movement would also allow for the particles to travel more perpendicular in a similar direction relative to the direction of the magnetic fields of the cusps, reducing the amount of particles that can escape the system. A more perpendicular movement of particles forces them to interact with the magnetic fields that are more mirrored. Also, this type of particle movement promotes more equal distribution of pressure created by confined particles. Since this type of rotational curved movement reduces the amount of pressure acting upon the system because the outward force of the confined particles is reduced by converting particle momentum on the field from a direct linear force to an angular one;

the particle interactions with confining fields occur with less direct momentum and force. In addition, to having a rotational movement of electrons within the plasma, a current should be produced from the confined plasma.

To accomplish this, there is provided a confinement apparatus including a plurality of conductive coils, where the plurality of conductive coils arranged contiguous with each other. The plurality of conductive coils including a first sub-plurality of conductive coils, where each conductive coil of the first sub-plurality of conductive coils having a through-bore therein, each through-bore having a first axis directed to a confined center at the center of the confinement apparatus, and a second sub-plurality of conductive coils, where each conductive coil of the second sub-plurality of conductive coils having a through-bore therein, each through-bore of the second sub-plurality of conductive coils having a second axis directed off-center to stimulate rotation of a plurality of particles in a first rotational direction. The first sub-plurality of conductive coils are arranged such that at least one of the first axes are arranged to pass through the confined center of the confinement apparatus, and the second sub-plurality of conductive coils are arranged such that at least one of the second axes are arranged to pass off-center while remaining within the confinement apparatus. A confinement system comprising a primary chamber having a wall that encompasses at least one electron discharger, at least one power supply, at least one injector arranged to insert a first material and a primary non-conductive confinement apparatus support attached to the confinement apparatus, arranged to couple the confinement apparatus to the wall of the primary chamber.

Thus there is a long-felt need for an apparatus and system for enhancing the confinement of generated plasma.

BRIEF DESCRIPTION OF DRAWINGS

For simplicity of illustration, bearings, magnets, wirings, motors, vacuum chamber, rotors, commutator, brushes, ion emitters, plasma cannons and electron beams and minutiae of common engineering hardware are not depicted as they are known to those with skill in the art. When they are shown, it is purely for illustrative purposes and not intended to capture all embodiments of the invention disclosed.

DETAILED DESCRIPTION OF INVENTION

Figure 1:
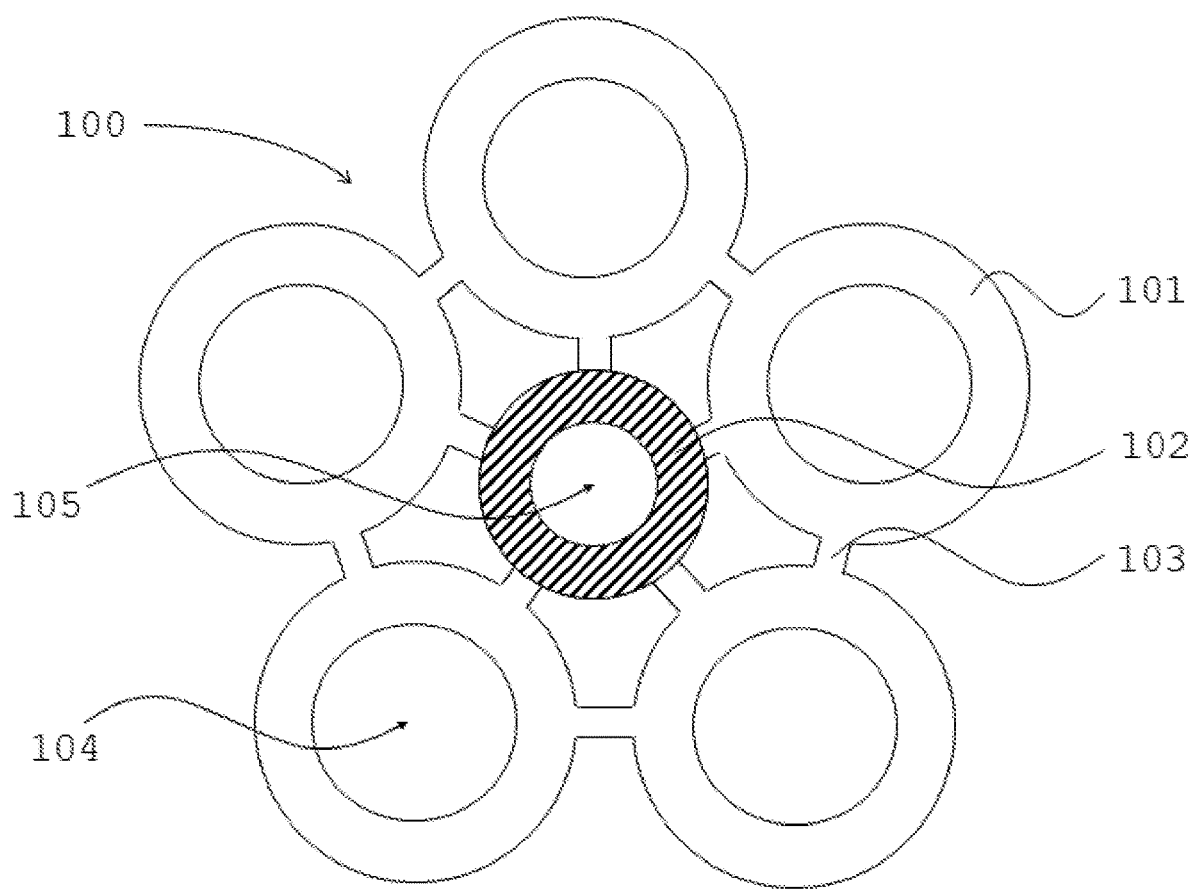
FIG. 1 illustrates at conductive coil pattern used to build the confinement apparatus described herein.

The various embodiments and variations there of illustrated in the accompanying figures and/or described herein are merely exemplary and are not meant to limit the scope of the invention. It is to be appreciated that numerous variations of the invention have been contemplated as would be obvious to one of ordinary skill in the art with the benefit of this disclosure. Rather, the scope and breadth afforded this document should only be limited by the claims provided herein while applying either the plain meaning to each of the terms and phrases in the claims or the meaning clearly and unambiguously provided in the specification.

The terms and phrases as indicated in parenthesis (" ") in this section are intended to have the meaning ascribed to them in this section applied to them throughout this document including the claims unless clearly indicated otherwise in context.

The term 'or' as used in this specification and the appended claims is not meant to be exclusive rather the term is inclusive meaning "either or both'.

References in the specification to "one embodiment", "an embodiment", "a preferred embodiment", "an alternative embodiment', 'embodiments', 'variations", "a variation' and similar phrases mean that a particular feature, structure, or characteristic described in connection with the embodiment(s) or variation(s) is included in at least an embodiment or variation of the invention. The appearances of the phrase "in one embodiment" or "in one variation" in various places in the specification are not necessarily all referring to the same embodiment or variation.

The term "couple", "coupled", "connected', 'joined, "welded", "glued", "attached" or "fixed" as used in this specification and the appended claims refers to either an indirect or direct connection between the identified elements, components or objects. Often the manner of the coupling will be related specifically to the manner in which the two coupled elements interact.

The term "magnetic coil", "conductive coil" or "coil" as used in this specification and the appended claims refers to either a first sub-plurality of conductive coil or second sub-plurality of conductive coil.

The term "NESAR" or "Neutralizing Electron Shifting Anode Reactor" as used in this specification and the appended claims refers to the "Fusion Energy Device with Possible Gravitational Effects".

The term "angled conductive coil" as used in this specification and the appended claims refers to a second sub-plurality of conductive coils.

The term "Chamber" as used in this specification and the appended claims refers to a vacuum pressured space or an enclosed space or cavity that has a negative pressure.

The term "Confined center" or "Rotation point" as used in this specification and the appended claims refers to a point or location formed by the first sub-plurality of conductive coils where a collective of moving particles rotate about.

The term "Off-Center" or "Off-Rotation point" as used in this specification and the appended claims refers to the through-bore imaginary axis of the second sub-plurality of conductive coils directed away from a confined center but still remaining within the confines of the confinement apparatus.

The term "Non-conductive confinement apparatus support" as used in this specification and the appended claims refers to a non-conductive support that is either a rod, shaft or pipe in a cylindrical shape that may or may not be multisided and many or may not be hollow.

The term "first axis" or "first center" as used in this specification and the appended claims refers to the through-bore imaginary axis at the center of the first sub-plurality of conductive coils that are directed to form a confined center to the confined plasma.

The term "second axis" or "second center" as used in this specification and the appended claims refers to the through-bore imaginary axis at the center of the second sub-plurality of conductive coils that are directed off-center to perpetuate a collective rotational pattern to the confined particles about a confined center.

The term "electron discharger", "wire grid", "grid", "electron emitter" or "electron gun" as used in this specification and the appended claims refers to any device that produces electrons used for the nuclear fusion process.

The term "NESAR", "NESAR confinement system" or "confinement system" as used in this specification and the appended claims refers to the Neutralizing Electron Shifting Anode Reactor (NESAR) confinement system.

The term "NESAR confinement apparatus", "confinement apparatus" as used in this specification and the appended claims refers to the Neutralizing Electron Shifting Anode Reactor (NESAR) confinement apparatus.

The term "injector" as used in this specification and the appended claims refers to a device used for injecting a first material into the NESAR confinement system.

The term "variable emitter" as used in this specification and the appended claims refers to a device used for injecting a second material into the NESAR confinement system.

The term "first rotational direction" as used in this specification and the appended claims refers to the common rotational direction of the confined particles and plasma within the NESAR confinement apparatus.

The term "second rotational direction" as used in this specification and the appended claims refers to the rotational direction of the NESAR confinement apparatus.

The term "first material" as used in this specification and the appended claims refers to a material that can either be deuterium, tritium, hydrogen, a hydrogen isotope, electrons, ions, neutrons, protons, plasma, or a combination thereof.

The term "second material" as used in this specification and the appended claims refers to a material that can either be deuterium, tritium, hydrogen, a hydrogen isotope, electrons, ions, neutrons, protons, plasma, or a combination thereof.

There are hundreds of tiny components associated with the fusion industry that are excluded from the descriptions herein; Items such as conductive coil or magnetic ring detail, system grounding details, motor or multipolar rotating electric machine detail, fusion fuel injector detail, power supply detail, voltage potential detail, vacuum detail, electron beam detail, plasma cannon detail, ion emitter detail, washers, nuts, bolts, bearings, brushes, shafts, rotors, commutators, O-rings and the like.

Those individuals with ordinary skill in the art, with the benefit of this disclosure can, from the descriptions and diagrams provided herein easily and obviously understand and determine exactly what is required to manufacture, assemble, or buy items not shown.

The purpose of this invention is to meet the break event point by maximizing the confinement of plasma and particles within the system by closer resembling the working reactors that are observed in nature, e.g., our solar system's sun and other observable stars. Embodiments of the confinement system 400 called the Neutralizing Electron Shifting Anode Reactor (NESAR) along with the explanations of the means of the improved confinement of plasma and particles and possible gravity effects are described in the following passages.

Figure 2:
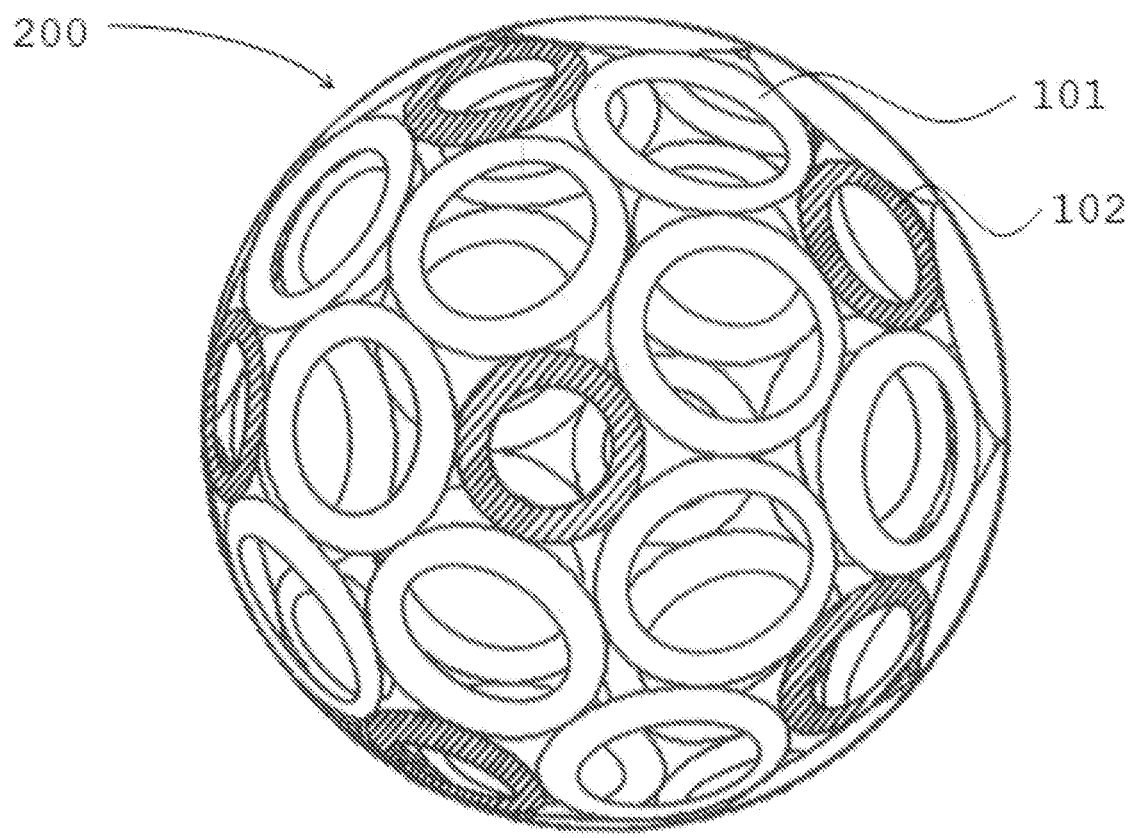
FIG. 2 is a confinement apparatus made of a plurality of conductive coil patterns shown in FIG. 1.

FIG. 1 is a magnified view of the pentafoil conductive coil pattern 100 used to construct the spherically shaped confinement apparatus 200 (shown in FIG. 2). This pattern consists of 5 larger conductive coils, these large conductive coils are a part of a plurality of larger coils referred to as the first sub-plurality of conductive coils 101, surrounding a smaller angled conductive coil, the smaller angled conductive coil is one of a plurality of smaller angled conductive coils referred to as the second sub-plurality of conductive coils 102. Each of the first sub-plurality of conductive coils 101 has a through-bore axis referred to as the first axis 104, that is directed to form a confined center 601 (illustrated in FIG. 6) for the confined particles and plasma within the confinement apparatus 200, while the second sub-plurality of conductive coils 102 has a through-bore axis referred to as the second axis 105, that is angled off-center relative to the formed confined center 601 within of the confinement apparatus 200. All of these conductive coils are connected by hollow non-conductive connectors 103. Each of the conductive coils are in the shape of a ring/toroid. The conductive coils are made of wounds of conductive wire, copper in this situation, surrounded by a smooth enclosure, e.g., stainless steel. The purpose of the stainless steel enclosure is to protect the conductive coils from the extreme temperatures produced during the fusion process. The pentafoil conductive coil pattern 100 was chosen as the pattern to construct the spherically shaped confinement apparatus 200, that is depicted in FIG. 2, because covering a spherical surface with equally sized circles, in this case circular/toroid shaped conductive coils, will leave one or more of the spherical areas between the magnetics coils unsymmetrical to the rest of the spherical confinement. To create the most efficient and uniform magnetic confinement for a spherically shaped system, one or more of the conductive coils for the system will need to differ in size.

Figure 27:
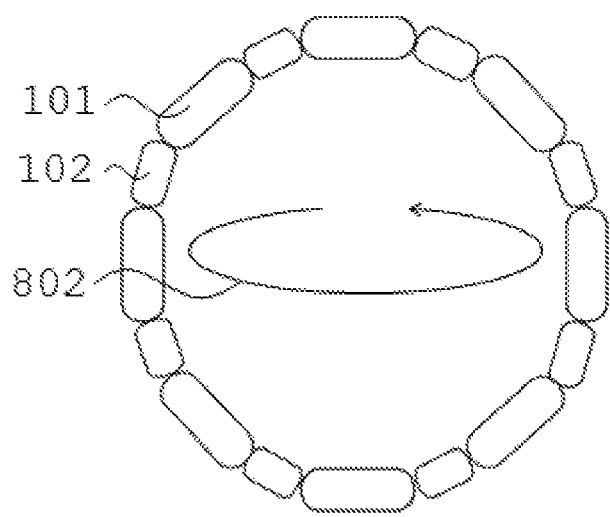
FIG. 27 is an illustration depicting the NESAR confinement apparatus with all of the first sub-plurality of conductive coils with equal electromagnetic field strength.

FIG. 2 depicts the pattern from FIG. 1 in a plurality to form the confinement apparatus 200 that will confine the plasma and particles about a confined center 601 located at the center of the system. The first sub-plurality of conductive coils 101 and second sub-plurality of conductive coils 102 can be seen in this diagram. Since the hollow non-conductive connectors 103 are small, they are not depicted in this larger scale system relative to FIG. 1. In this diagram, all of the magnetic fields from the first sub-plurality of conductive coils 101 will have their magnetic fields directed to the center of the system to form a confined center. The second sub-plurality of conductive coils 102 will have their magnetic fields directed within the confinement apparatus 200 with their second axes 105 directed collectively off-center in a direction that will propagate a stable rotation throughout the confined plasma and particles in a first rotational direction 801 (shown in FIG. 14). Even though FIG. 2 depicts only a portion of the conductive coils directed off-center, the production of a confinement apparatus 200 comprising of a majority or only angled conductive coils like the second sub-plurality of conductive coils 102 should be effective in forming a stable confined center 601 as well. Depicted in FIG. 27 is an alternative configuration that could be used as a confinement apparatus 200.

Figure 3:
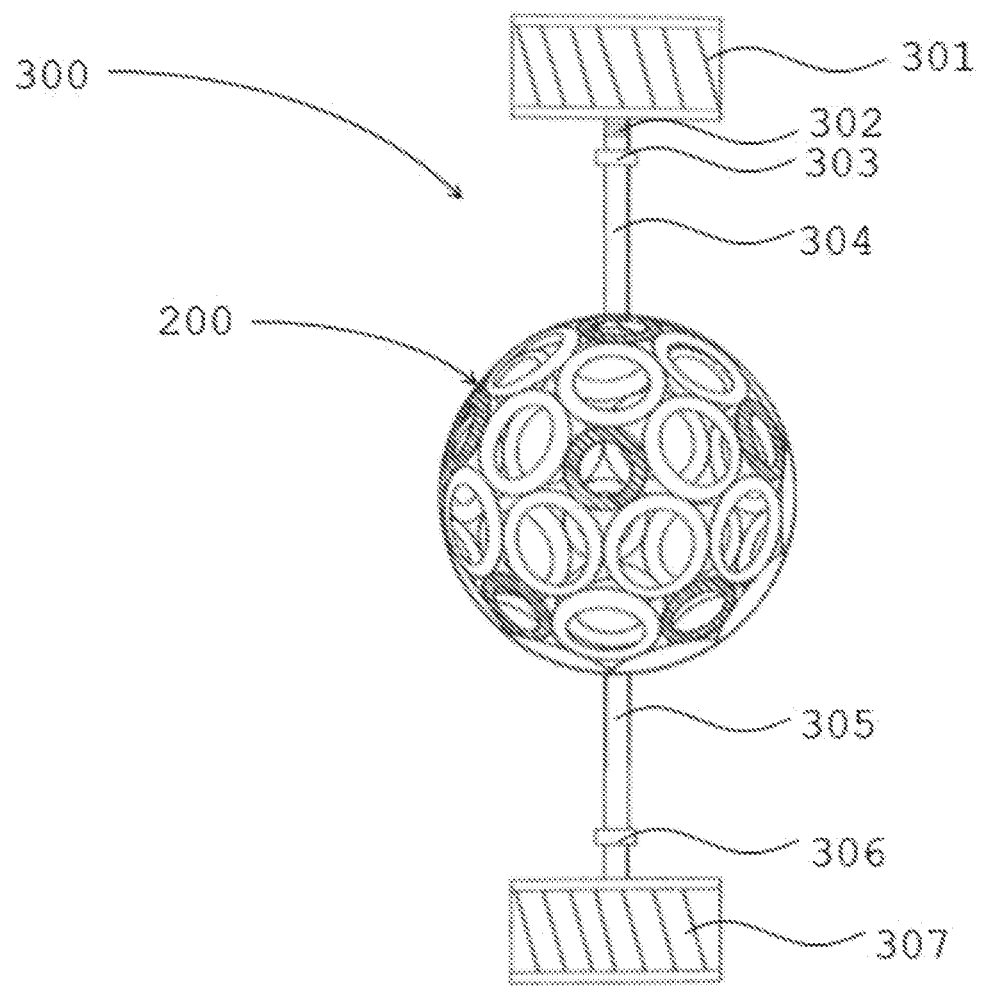
FIG. 3 is a side view of a confinement apparatus support with supporting components attached.

FIG. 3 is a side view of the NESAR confinement apparatus support 300 comprising the confinement apparatus 200 attached to a primary non-conductive confinement apparatus support 304 and secondary non-conductive confinement apparatus support 305 comprising the essential components of a multipolar rotating electric machine. In FIG. 3 the primary non-conductive confinement apparatus support 304 and secondary non-conductive confinement apparatus support 305 are hollow. At the end of the primary non-conductive confinement apparatus support 304 is a first rotor 301 and at the end of the secondary non-conductive confinement apparatus support 305 is a second rotor 307. Also attached on the primary non-conductive confinement apparatus support 304 is a first bearing 303 and on the secondary non-conductive confinement apparatus support 305 is a second bearing 306. These bearings are attached to the wall of the primary chamber 403 to stabilize and assist in a frictionless second rotational direction 802 (shown in FIG. 14) of the confinement apparatus 200 that rotates opposite of the first rotational direction 801. This second rotational direction 802 will improve the confinement and stabilization of the plasma and particles within the system. On the primary non-conductive confinement apparatus support 304, between the first rotor 301 and the first bearing 303, is a commutator 302. A first current 401 (shown in FIG. 4) passing though this commutator 302 is transferred to the conductive coils throughout the confinement apparatus 200; creating the potential difference that accelerates electrons to the confines of the confinement apparatus 200.

Figure 4:
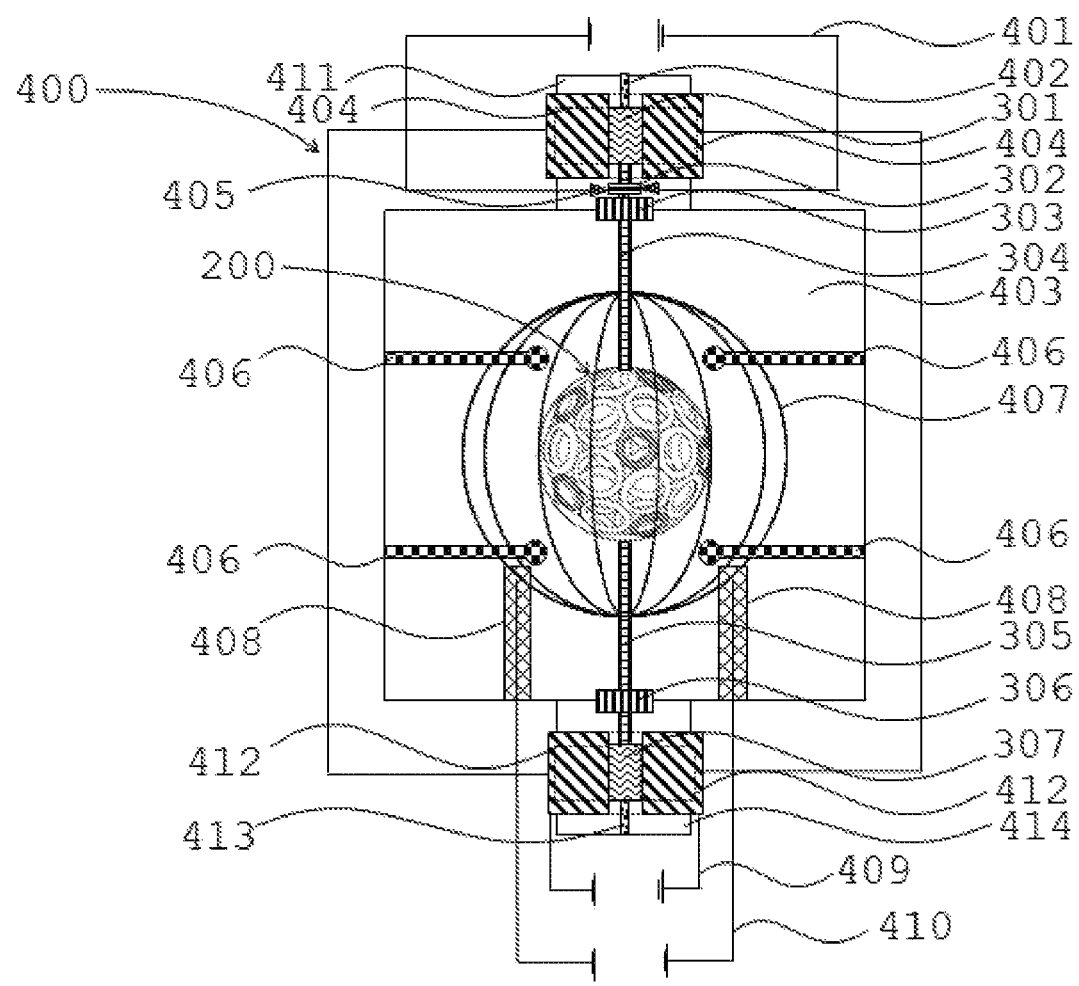
FIG. 4 is a side cross-section view of the NESAR confinement system.

FIG. 4 is a side cross-sectional view of the NESAR confinement system 400, with the confinement apparatus support 300 coupled and integrated with the remaining components and parts. The confinement apparatus support 300 is joined to the rest of the system at the first bearing 303 and second bearing 306. The first bearing 303 and second bearing 306 are attached to the wall of the primary chamber 403 mirroring each other. The first current 401 for the confinement apparatus 200 is connected to the brushes 405 within a secondary chamber 411 that makes contact with the commutator 302 attached to the primary non-conductive confinement apparatus support 304. The feed and return current from commutator 302 is then transferred to the conductive coils throughout the confinement apparatus 200. Even though the confinement apparatus 200 comprises brushes 405 and a commutator 302 like a DC armature, these components are not to alternate magnetic fields and cause the confinement apparatus 200 to rotate. The provided current from these brushes and commutator are to provide a voltage potential between the electron discharger 407, which is a wire grid surrounding the confinement apparatus 200, and the confinement apparatus 200. A surrounding wire grid is used as the electron discharger 407, but is not required for the NESAR confinement system 400 to operate effectively. The alternative way electrons can be directly inserted within the confinement apparatus 200 is from an electron discharger 407 as an electron emitter from either the first variable emitter 402 or second variable emitter 413 positions. The first current 401 energizes the confinement apparatus's 200 first sub-plurality of conductive coils 101 and second sub-plurality of conductive coils 102 for plasma and particle confinement along with creating the voltage potential to accelerate electrons towards the confinement apparatus 200.

The feed and return current of a third current 410 is connected to the wire grid electron discharger 407 through the non-conductive electron discharger supports 408. If the voltage associated with the third current 410 is higher than the voltage associated with the first current 401; a potential difference is created between the anode, i.e., the confinement apparatus 200, and the cathode, i.e., the wire grid electron discharger 407. This potential difference causes the excess electrons within the primary chamber 403 to accelerate towards the confines of the confinement apparatus 200.

Again, attached at the end of the primary non-conductive confinement apparatus support 304 is the first rotor 301, and attached at the end of the secondary non-conductive confinement apparatus support 305 is the second rotor 307. The first rotor 301, the first bearing 303, the brushes 405, and the commutator 302 are encapsulated within the secondary chamber 411 that is attached to the surface of the primary chamber 403. Encircling the secondary chamber 411 is a first stator 404. The second rotor 307 and the second bearing 306 are encapsulated within the tertiary chamber 414 that is attached to the surface of the primary chamber 403. Encircling the tertiary chamber 414 is a second stator 412. A second current 409 provides the voltage to the first stator 404 and the second stator 412 to produce alternating fields that induces the first rotor 301 and the second rotor 307 to rotate in the same direction. The induced rotation of the first rotor 301 and the second rotor 307 causes the confinement apparatus 200 to rotate in the second rotational direction 802 that is in the opposite direction of the first rotational direction 801. Though it is not depicted, the primary chamber 403, secondary chamber 411 and tertiary chamber 414 have a negative pressure that is perpetuated by at least one motor.

Once the first current 401, third current 410 and second current 409 are collectively energized from at least one power supply, the electrons from the wire grid electron discharger 407 gather in excess on the wire grid electron discharger 407 surface by heating the metal grid surface. The excess of electrons are then pulled away from the higher voltage cathode, i.e., the wire grid electron discharger 407, and accelerated towards the confines of the lower voltage anode, i.e., the confinement apparatus 200. This method of emitting electrons is called "cap-discharge". This method of electron emission is the preferred method for the NESAR confinement system 400 for three reasons. First, the surrounding electrons being pulled into the system from all directions more closely resembles what we observe in nature with working fusion reactors like our own Sun. Second, as the electrons are accelerated and confined about the confined center 601 of the confinement apparatus 200, the electrons accelerating through the second sub-plurality of conductive coils 102 will produce a greater angular momentum upon the confined particles. This is because the momentum of the accelerated electrons along with the magnetic force produced by the second sub-plurality of conductive coils 102 will both be influencing the direction of the rotation. Some Polywell experiments have used electron guns directed to the center of the system. If the electron gun or emitter method were solely used as the electron source for the NESAR confinement system 400, the system would still operate effectively. The only possible disadvantage to solely using an electron gun or emitter would be that the rotational effects of the confined particles may take slightly longer due to the force of the second sub-plurality of conductive coils 102 delay in influencing particle rotation. Third, this method of electron emission should help in lowering the energy needed to meeting the break-even point, because the momentum of the electrons accelerated is being used to assist in the perpetuation of rotating the confined particles in the first rotational direction 801.

The confinement apparatus 200 is rotated in a second rotational direction 802, which is opposite to the first rotational direction 801, for two reasons: once the confined particles are in a Magnetic Dynamo Plasma (MDP) state, the collective plasma particles reduce in speed due to the plasma acting as a medium. This reduction of particle speed is relative to the density of the plasma. This particle speed reduction allows for the possibility of the physical rotation of the confinement apparatus 200 to assist in the confinement of particles and plasma. If the confinement apparatus 200 is rotated fast enough in the opposite direction of the collective particles and plasma confined in a first rotational direction 801, the amount of time that the particles will have to escape the system through the magnetic cusps will be reduced, thus improving the confinement of particles within the NESAR confinement system 400.

The rotating electrons being confined within the NESAR confinement apparatus 200 create a rotating negative potential well. Once this occurs the injectors 406 can inject a first material. The first material can either be deuterium, tritium, hydrogen, a hydrogen isotope, electrons, ions, neutrons, protons, plasma, or a combination thereof, and is inserted between the confinement apparatus 200 and the wire grid electron discharger 407. Even though FIG. 4 shows four injectors 406, there are actually a total of eight injectors 406. There are four injectors 406 uniformly surrounding the northern and southern hemispheres of the confinement apparatus 200. As the first material is inserted, it will become ionized due to the rotating negative potential well created by the confined electrons, thus accelerating the ions towards the rotating negative potential well where the fusing of these ions can occur.

Depended upon what is going to maximize the fusion process of the NESAR confinement system 400, the first variable emitter 402 or second variable emitter 413 mirroring each other can be interchanged with an emitter that discharges a second material that can either be plasma, anti-particles, deuterium, tritium, hydrogen, a hydrogen isotope, electrons, ions, neutrons, protons, plasma, or a combination thereof to enhance the fusion reactions or possible gravitational effects desired. The main goal of the NESAR confinement system 400 is to be the world's first fusion reactor that meets and surpasses the break-even point, and achieving this goal by trying to simulate what actually happens in our own Sun.

Figure 5:
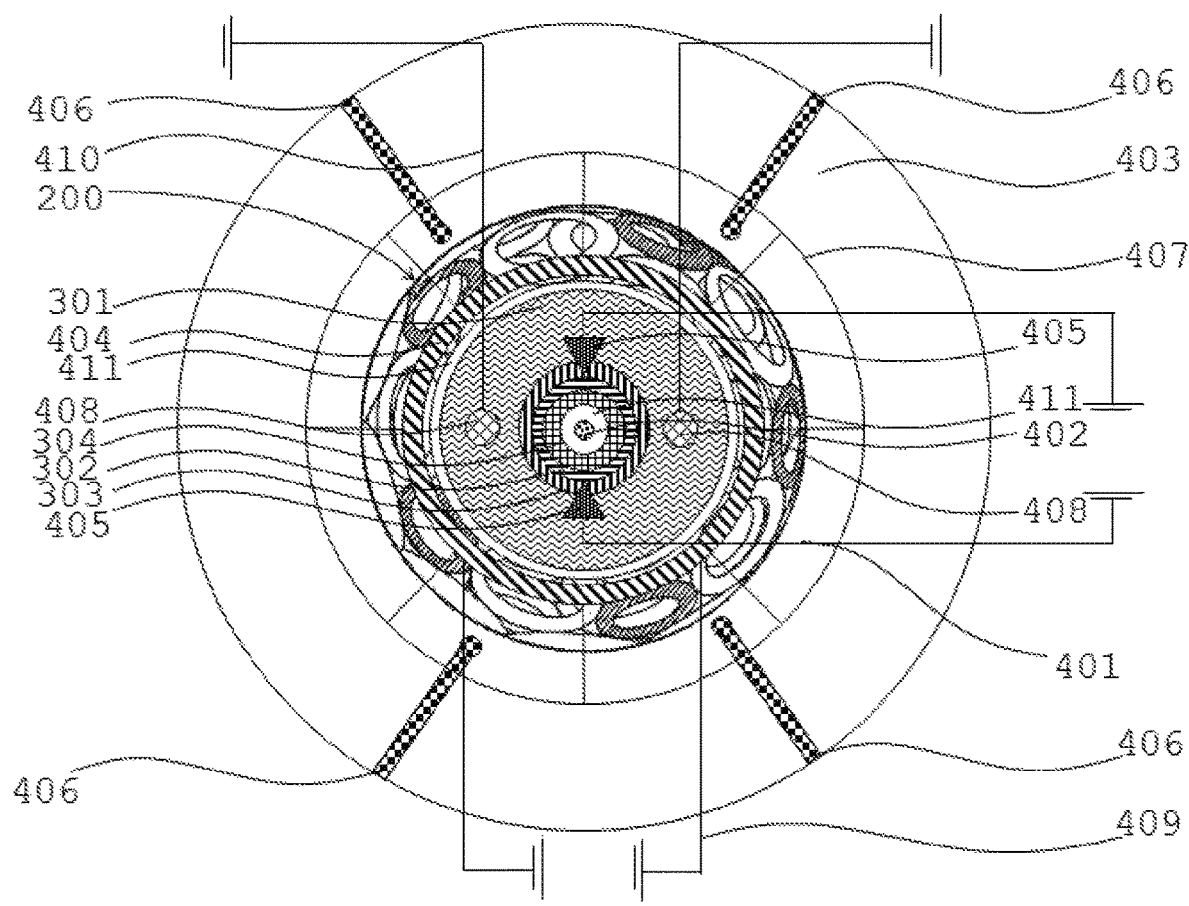
FIG. 5 is a top cross-section view of the NESAR confinement system.

FIG. 5 is a top cross-sectional view of the NESAR confinement system 400. This drawing is an overlay of multiple cross-sections of what was depicted in FIG. 4. All of the same components and parts covered in the detailed description for FIG. 4 are the same as in FIG. 5.

Figure 6:
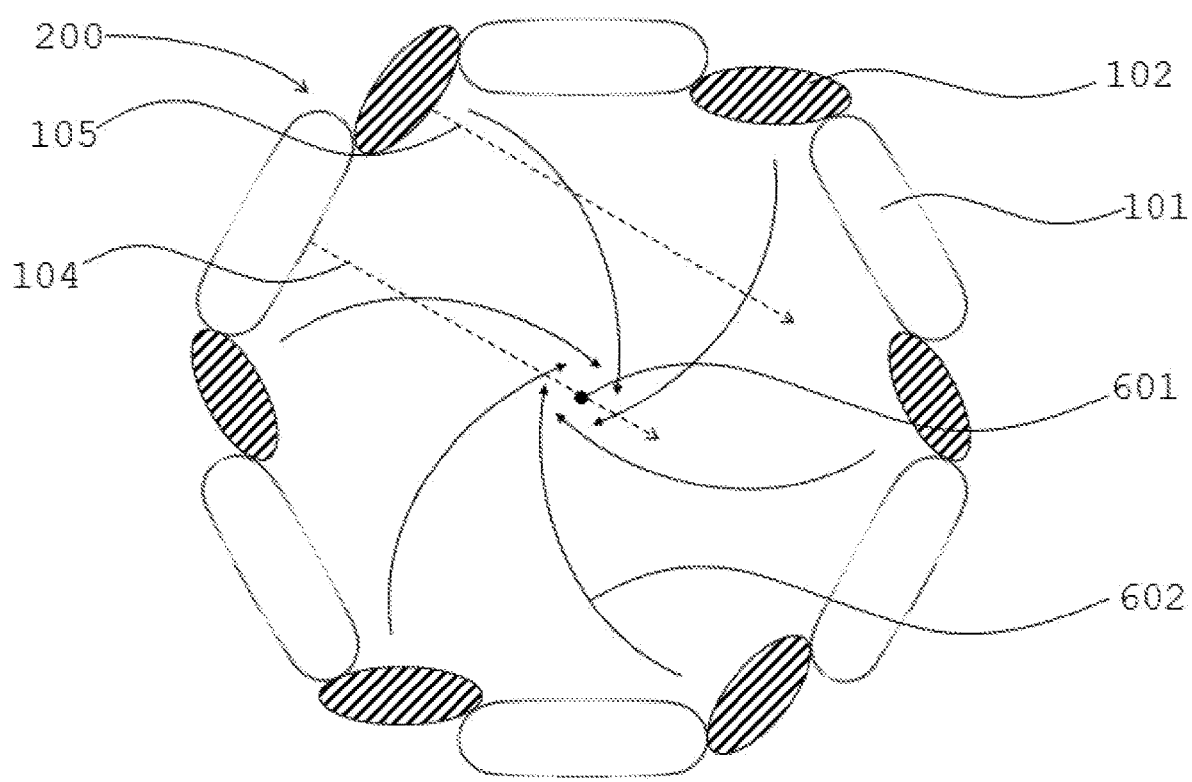
FIG. 6 is a cross-section top view illustrating particle movement within the NESAR confinement apparatus.

FIG. 6 is a top cross-sectional (horizontal plane) depiction of the particle movement within the NESAR's confinement apparatus 200. The magnetic fields of the first sub-plurality of conductive coils 101 creates a confined center 601 by having their first axis 104 directed inward to a single point within the confinement apparatus, while the second sub-plurality of conductive coils 102 pushes electron particles in a rotational pattern around the same confined center 601 by having their second axis 105 directed off-center. Even though a confined center 601 is created by having the first axes 104 directed at the same point in FIG. 6, this is not the only way to create a confined center 601 to the confined rotating particles. The creation of a confined center 601 is achieved by having a collection of objects whose magnitudes directly interact at a single relative point. The curved arrows are a depiction of the curved magnetic fields 602 within the confinement apparatus 200 exerted from the conductive coils of the confinement apparatus 200. This shows from the perspective of the horizontal plane that a clockwise first rotational direction 801 will be perpetuated if the second sub-plurality of conductive coils 102 are relatively and equally angled off-center in the same direction. The angle that the second sub-plurality of conductive coils 102 need to be tested for optimum angle tilt to maximize particle confinement and fusion production; but for this system to meet the break-even point a general rotation put upon the confined particles and plasma should achieve this break-even goal. Placing any type of first rotational direction 801 upon the confined plasma and particles within the NESAR will greatly increase the chances of surpassing the break-even point, because our own Sun compared to other stars is not that great at producing fusion reactions within its core, but nevertheless it is a functional fusion confinement system. As long as the system can confine particles and plasma, while rotating these confined elements; then the possibility for a Sun like reactor is possible whether it is extremely efficient or not.

Figure 7:
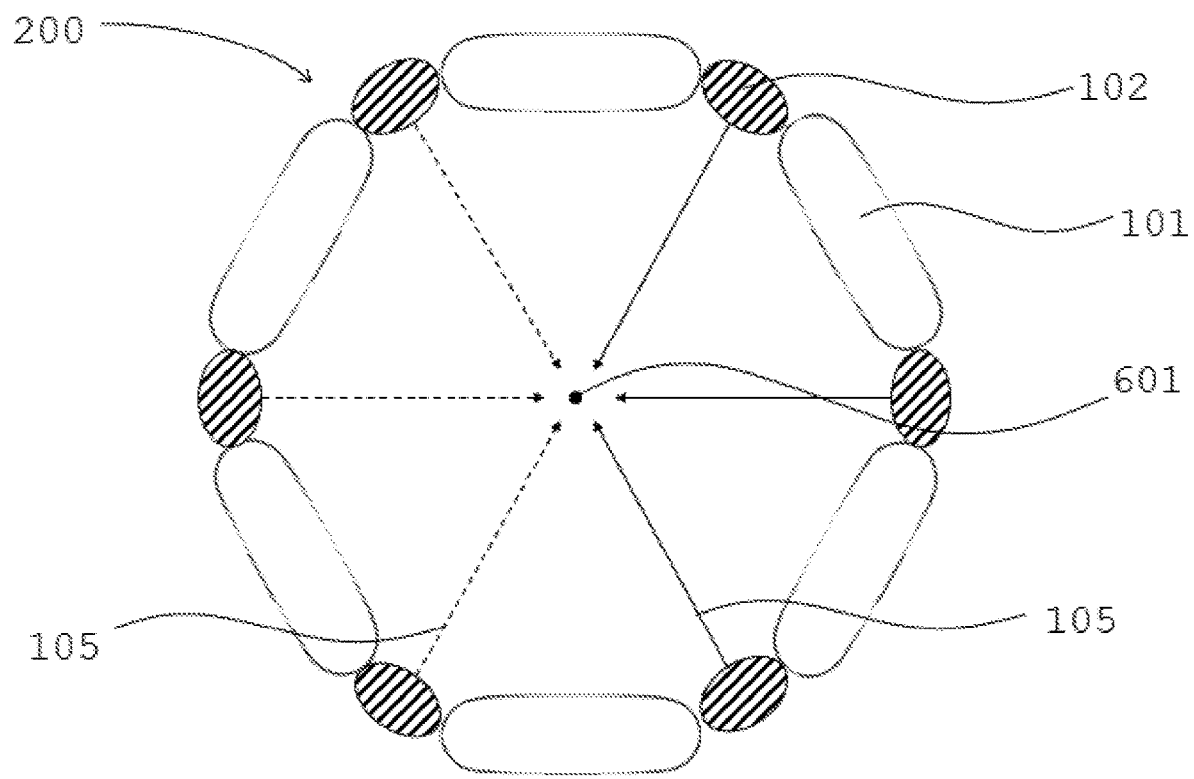
FIG. 7 is a cross-section side view of the particle movement within the NESAR confinement apparatus.

FIG. 7 is a side cross-sectional (vertical plane) depiction of the particle movement within the NESAR's confinement apparatus 200. The dotted and solid arrows are a depiction of the direction of the magnetic forces of the second sub-plurality of conductive coils 102 with in the confinement apparatus 200. The magnetic forces of the first sub-plurality of conductive coils 101 are not shown, because these are directed to the center of the system forming the confined center 601. The second sub-plurality of conductive coils 102 are directed to an off-rotation point, and if one wants to continue the clockwise rotation that was depicted in FIG. 6, the solid arrows are the second axes 105 directed off-center within the confinement apparatus 200 towards the foreground, while the dotted arrows are the second axes 105 directed off-center towards the background.

If the NESAR confinement system 400 is a device that is truly similar in simulating our own Sun, then the NESAR's collective magnetic forces directed to and about a confined center 601 while perpetuating a rotation on a horizontal plane would be a definite reason why we often observe new stars in their initial forming stages as a rotational disc in the same direction and plane as the center of its system.

Electron Confinement of NESAR Compared to Polywell

Figure 8:
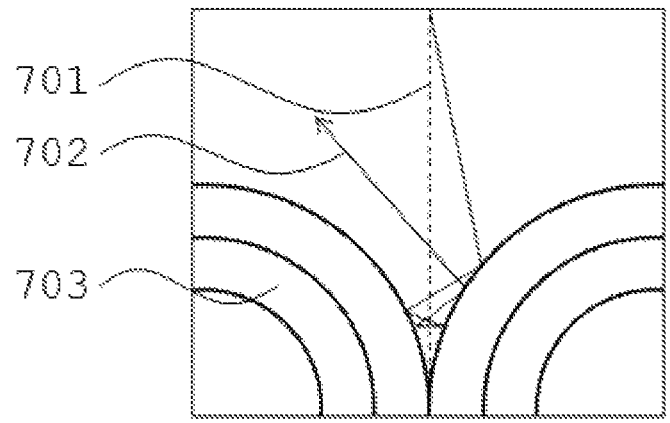
FIG. 8 is an illustration of particle movement within a polywell at the magnetic cusps.

The problem with the Polywell is that it does not confine enough electrons 702 (shown in FIG. 8) to meet the break-event point of fusion because too many electrons 702 escape at the magnetic field cusp axes 701 (shown in FIG. 8) once the confinement pressure of the electrons 702 increases enough to create an escape path between the contiguous magnetic fields 703. FIG. 8 depicts an arrow representing the movement of an electron 702 being confined when the confinement pressure is low enough to successfully deflect the electron 702 back into the system away from the magnetic field cusp axis 701.

Figure 9:
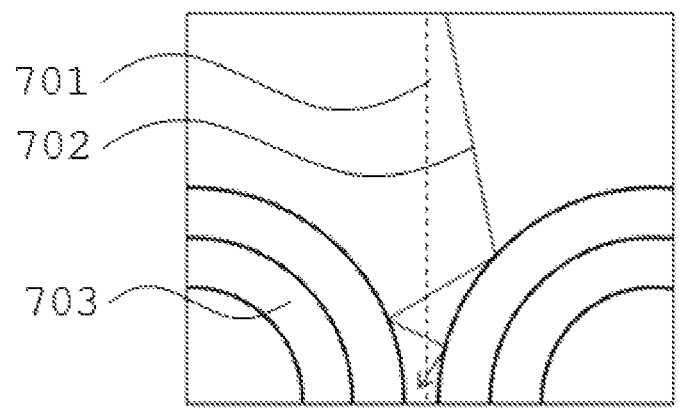
FIG. 9 is an illustration of particle movement within a polywell at the magnetic cusps while experiencing increased confinement pressure.

Depicted in FIG. 9 is the effect of increased electron confinement pressure in a Polywell, which has resulted in widening the magnetic field cusp axis 701 enough for this electron 702 to escape the system. Since there is no rotational movement placed upon the electrons 702 in a Polywell, they travel linearly and much more parallel to the magnetic field cusp axes 701. This type of motion allows for electrons 702 to escape the magnetic field cusp axes 701 much easier than a perpendicular motion.

When comparing the Polywell Reactor to the NESAR confinement system 400, the NESAR confinement system 400 should confine more electrons 702 at a lower pressure for the simple reason that the electrons 702 are rotating in the same general direction, the first rotational direction 801. This will allow the electrons 702 to move in a tightly aligned motion with each other. Also, these electrons 702 will interact with the magnetic field cusp axes 701 at a more perpendicular magnitude, which reduces the amount confinement pressure exerted upon the confining magnetic fields 703.

FIGS. 10, 11, 12, 13 depict the trajectories of the confined electron 702 within the NESAR confinement system 400 as a linear motion to better illustrate that they will interact more perpendicularly to the magnetic field cusp axes 701, but in reality the collective magnetic fields 703 within the confinement apparatus 200 place a curved trajectory upon the confined electrons 702 and particles. These curved trajectories cause the confined particles to rotate spherically within the confinement apparatus 200. Due to these curved particle movements, geodesic deviation effects may enhance the confined particles to become denser and possibly exhibit some gravitational effects.

Figure 10:
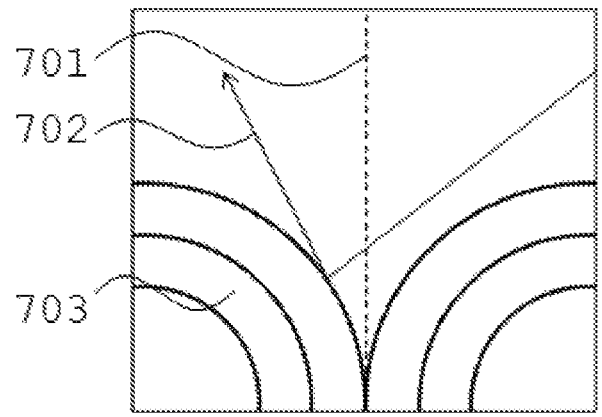
FIG. 10 is an illustration of particle movement within the NESAR confinement system at the magnetic cusps without rotating the confinement apparatus.

FIG. 10 depicts an electron 702 traveling within the confinement apparatus 200 with a curved rotational motion exerted by the second sub-plurality of conductive coils 102. As the electron 702 interacts with the magnetic fields 703 and magnetic field cusp axis 701 at a more perpendicular trajectory motion in relation to the magnetic field cusp axis 701, the chance of escape decreases along with less magnetic field 703 force needed to redirect the electron 702 back within the confines of the confinement apparatus 200. This curved perpendicular movement reduces the force upon the confining magnetic fields 703 by interacting with these magnetic fields 703 with a more tangential force instead of a direct force.

Figure 11:
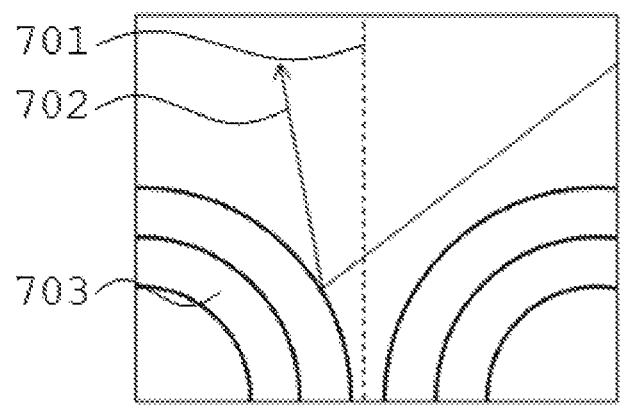
FIG. 11 is an illustration of particle movement within the NESAR confinement system at the magnetic cusps without rotating the confinement apparatus while experiencing increased confinement pressure.

FIG. 11 depicts an electron 702 trajectory within the confinement apparatus 200 as the confinement pressure has widened at the magnetic field cusp axis 701. Due to electrons 702 moving more perpendicular within the confinement apparatus 200, they have a much less likelihood that they will escape through the magnetic field cusp axis 701 compared to the Polywell when confinement pressure increases.

Figure 12:
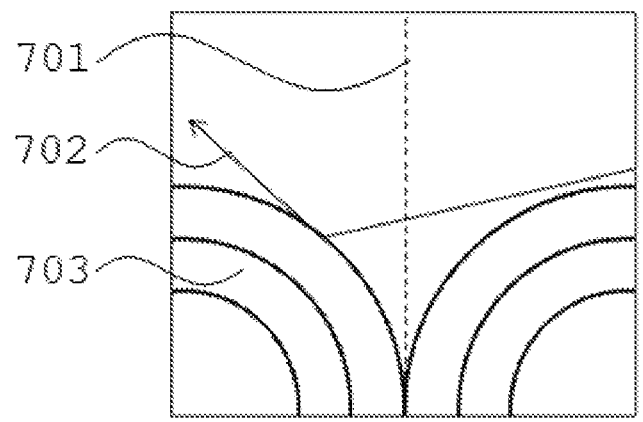
FIG. 12 is an illustration of particle movement within the NESAR confinement system at the magnetic cusps while rotating the confinement apparatus at high speeds.

FIG. 12 depicts an electron's 702 trajectory within the confinement apparatus 200, as the confinement apparatus 200 physically rotates in a second rotational direction 802, that is opposite of the first rotational direction 801. Since these electrons 702 are moving through a plasma medium, the speeds of the particles within the plasma slow down, and possibly enough to where the physical high speed rotation of the confinement apparatus 200 may greatly reduce the amount of time that electrons 702 may have to escape from the magnetic field cusp axis 701. The confinement apparatus 200 experiencing a second rotational direction 802, will cause the electron 702 in a first rotational direction 801 to experience an even more perpendicular trajectory relative to magnetic field cusp axis 701 and confining magnetic fields 703. This results in an even more improved confinement while creating a more spherical shaped confinement that results in enhancing geodesic effects. This enhancement in geodesic effects will produce denser and tighter alighted particles confined within the confinement apparatus 200 to assist in exceeding the break-even point at even lower energy consumptions.

Figure 13:
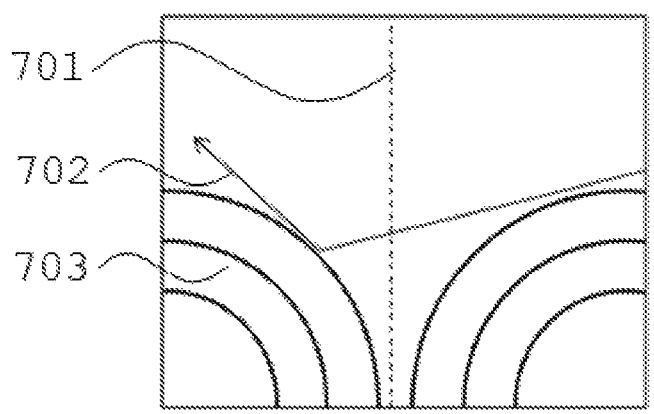
FIG. 13 is an illustration of particle movement within the NESAR confinement system at the magnetic cusps while rotating the confinement apparatus at high speeds and experiencing increased confinement pressure.

FIG. 13 depicts an electron 702 trajectory within the confinement apparatus 200 as the confinement pressure has widened at the magnetic field cusp axis 701. Due to electrons 702 moving more perpendicular within the confinement apparatus 200 because the confinement apparatus 200 moving in a second rotational direction 802, the electrons 702 have an even less likelihood that they will escape through the magnetic field cusp axis 701 even as the pressure increases.

Figure 14:
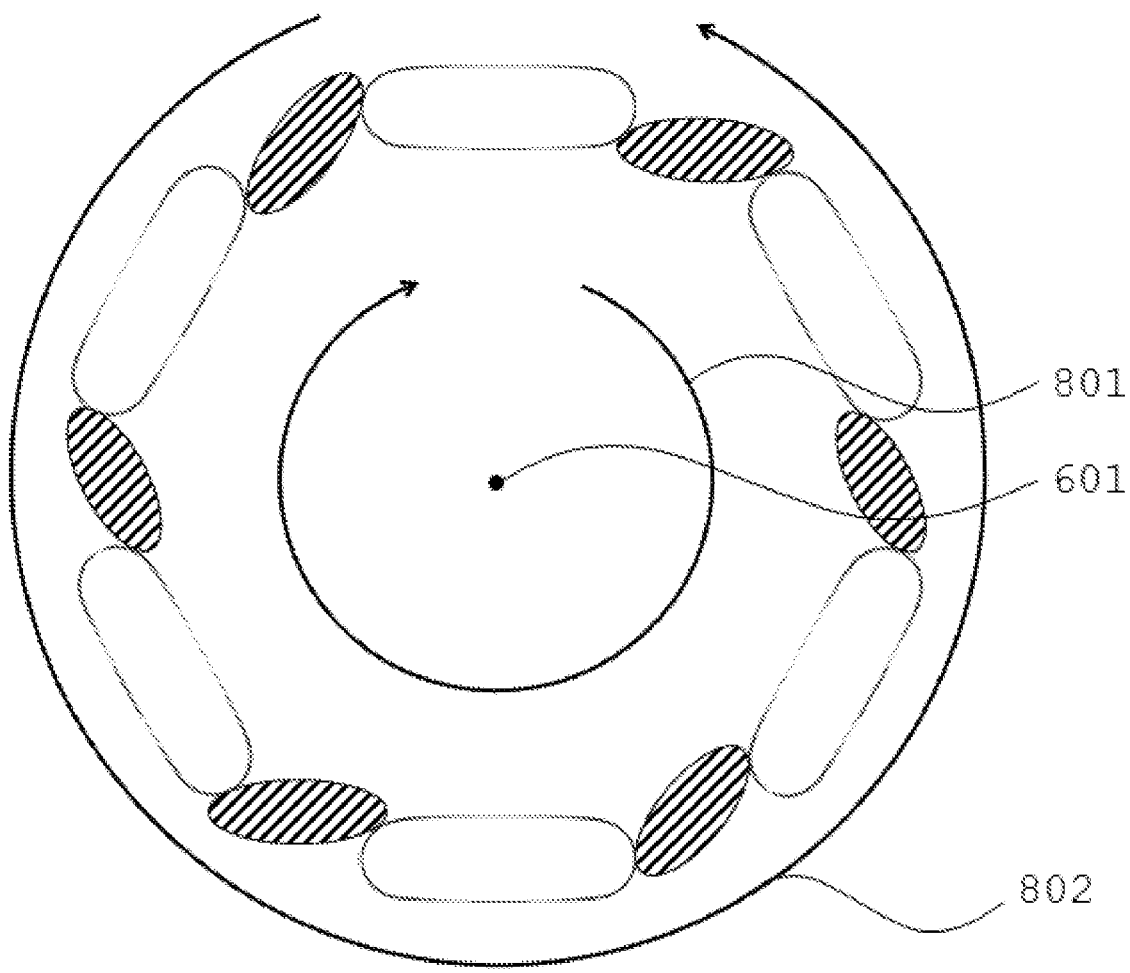
FIG. 14 is an illustration of particle rotation (first rotational direction) opposing confinement apparatus rotation (second rotational direction).

FIG. 14 depicts the confined particles rotating in a first rotational direction 801 within the confinement apparatus 200, while the confinement apparatus rotates in a second rotational direction 802 that is opposite to the first rotational direction 801.

Rotation of the confined particles and confinement apparatus 200 greatly improves particle confinement along with reducing the total amount of energy needed to confine these same particles. The particles in a first rotational direction 801 will move in a common, almost parallel, direction which allows these confined particles and plasma to yield a strong dipole magnetic field with geodesic deviational gravity effects. Allowing the confined particles and plasma to act as a small scale Magnetic Dynamo Plasma (MDP).

The NESAR confinement system 400 will meet the fusion break-even point, and due to its mass reduction in amounts of energy needed to confine particles for the fusion process it will meet this goal at a much smaller size. Once correctly calibrated, the NESAR confinement system 400 can meet the break-even point with a confinement apparatus 200 smaller than a standard basketball.

Electron Confinement of NESAR Compared to Tokamak

Currently, the method of nuclear fusion that has been the main focus in possibly reaching the break-even point is the Tokamak method. Tens of billions of dollars have been exhausted into this type of technology with little results. Only a couple of Tokamak fusion reactors have only been able to produce plasmas in a stable state for a little more than a minute before magnetic reconnection occurs and disrupts the reaction.

The largest and most expensive project that has absorbed the majority of the fusion resources using the Tokamak method is the International Thermonuclear Experimental Reactor (ITER). Alone it has currently costed more than 20 Billion Dollars and will not be completed until 2033. The total size of the ITER along with supporting facilities is expected to occupy the space of 60 soccer fields. According to the physicists working on ITER, once it is completed ITER will not be used or fitted to provide power to surrounding cities or towns. It will only be used to study magnetic confined fusion. Surprisingly it is a wonder that few have ask if all of the time, money, and effort invested into the ITER Tokomak is really an effective use of resources for an unproven fusion method that is colossal in size and requires huge amounts of energy while possibly still not working.

Sadly, all the physicists at ITER have done is a bunch of number crunching and have blindly promoted the ITER as stable fusion alternative by building the system with massive energy draining magnetics; instead of addressing the real failure issues with magnetic reconnection. The physicists at ITER should have come up with a more effective, smaller and less expensive concept years ago, and because of this ITER will never be able to sustain the right conditions to confine a dense enough plasma to meet the break-event point. Magnetic reconnection issues are not something one can just power through. The stronger the magnets used for confinement, the stronger the magnetic reconnection disturbance. The biggest tragedy of ITER is that this failing project has taken billions of dollars and focus away from other bright physicist that could have figured out a solution to this energy crisis years ago. The two main design issues with the Tokamak confinement systems in countering the effects of magnetic reconnection are as follows. First, the locations of the confining magnets promote magnetic reconnection disturbances to occur directly in the path of confined plasma moving in a ring shaped trajectory. Second, the confined plasma field 904 (shown in FIG. 16) is too weak to counter magnetic reconnection events due to a very low distribution of magnetic reconnection points 905 (shown in FIG. 16) along the confinement path.

Figure 15:
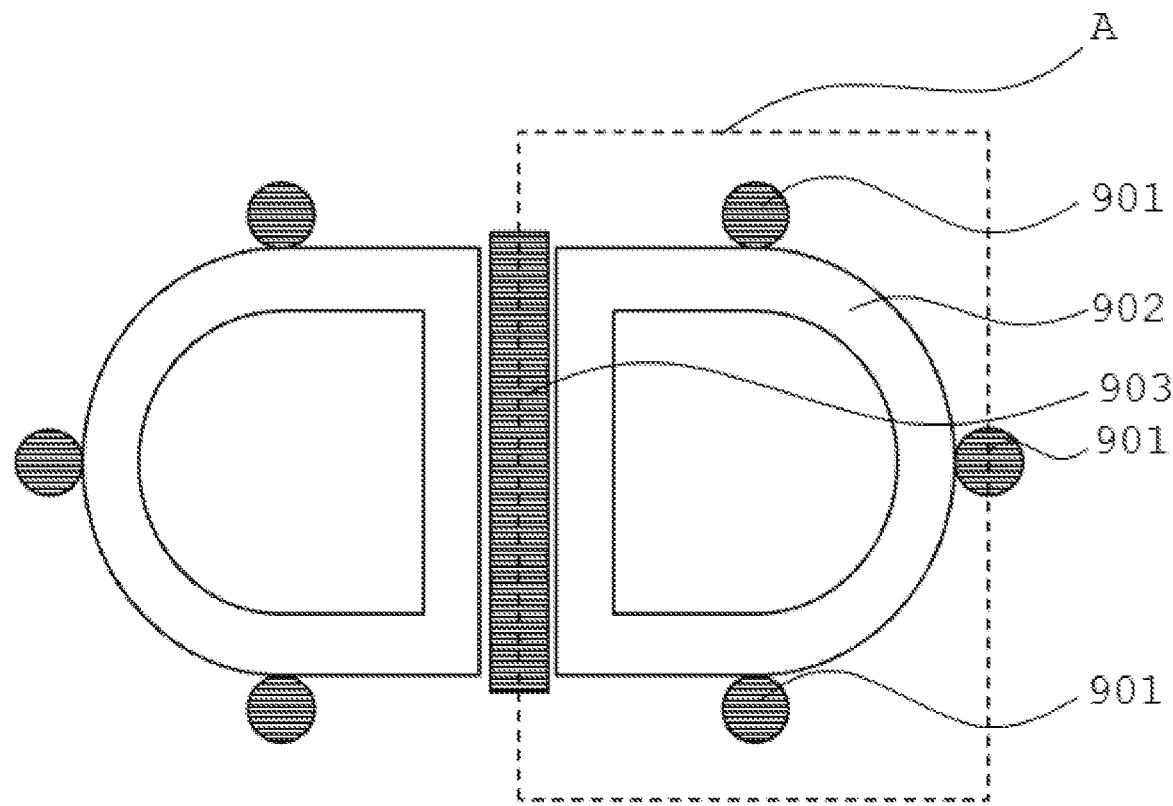
FIG. 15 is a cross-section depicting the confining magnets for a tokamak.
Figure 16:
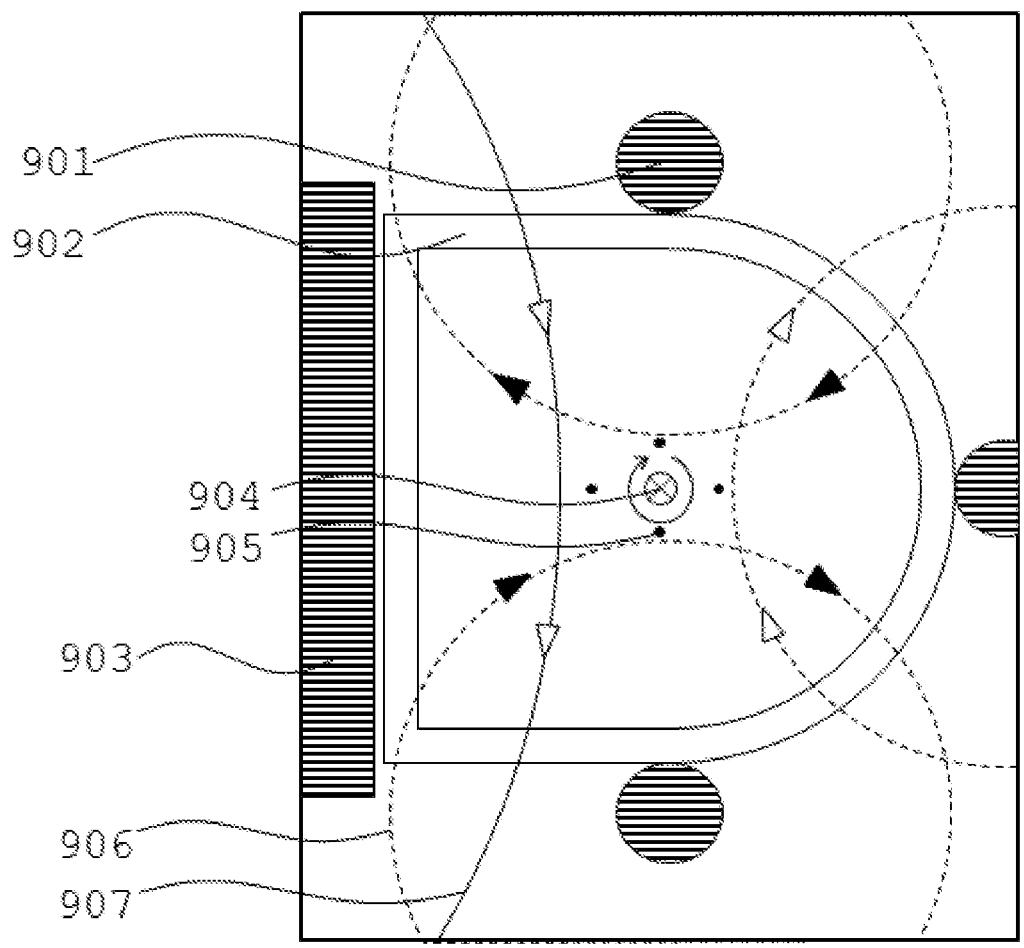
FIG. 16 is an enlarged cross-section depicting magnetic reconnection points within a tokamak.

FIG. 15 is a cross-section depicting the poloidal magnetics 901, toroidal magnets 902 and primary magnet 903 that are the main magnets that confine the particles within a Tokamak reactor. FIG. 16 is a cross-section magnification of the dotted box A in FIG. 15. In FIG. 16 the poloidal fields 906, primary field 907, confined plasma field 904 and magnetic reconnection points 905 are depicted.

In addressing the Tokamak's location of the confining magnets being the cause of the magnetic reconnection issues; magnetic reconnection events usually occurs when closely aligned magnetic fields travel parallel in opposing direction to one another. Magnetic fields are made of photons. So, when a magnetic reconnection effect occurs, the photon directions of these fields are redirected and ejected, pulling and disrupting the photon structure and flow from the weaker magnetic field more dramatically than the stronger magnetic field. In the Tokamak, these events occur directly with and in the trajectory path of the weaker confined plasma field 904. When these types of events occur directly between the stronger confining magnetic fields of the tokamak and the weaker confined plasma field 904; this disrupting event will interrupt the path of the confined plasma enough to cause the whole system to fail.

The magnetic fields of the toroidal magnets 902 are not emphasized in FIG. 16 because they create a dipole field while somewhat being aligned parallel with each other to push the confined plasmas linearly. If these toroidal magnets 902 create a reconnection event, the event mainly occurs on the outer edges of the confinement. Since the toroidal magnets 902 in the Tokamak are so powerful they still have the ability to disrupt the confined plasma's path, but they are more than likely not the main cause of these magnetic reconnection event that disrupt the Tokamak's ability to function effectively.

The confined plasma within the Tokamak is mainly compressed by multiple poloidal fields 906, linear fields, and the primary field 907, dipole field, located at the center of the Tokamak system, and it is the interaction between these magnetic fields running parallel to one another that are the main cause for these disruptive magnetic reconnection events. From initial research, most Tokamaks contain a single primary magnet 903, and two to four poloidal magnets 901. So, for FIG. 16, three poloidal magnets 901 are used to depict the basic cross-section of the Tokamak.

Once the confined plasma is pushed and rolled linearly through the Tokamak, a confined plasma field 904 is created, which is shown in a clockwise looping direction traveling into the page. Depicted in FIG. 16, are the four magnetic reconnection points 905 if magnetic reconnection events were to occur between the confined plasma field 904 and the confining magnetic fields or between the confining magnetic fields themselves. These magnetic reconnection points 905 are where the closely aligned poloidal fields 906 and primary field 907 travels parallel in opposing direction to one another which occurs in the directed path of the confined plasma. The confined plasma is a linear traveling, non-dipole, field within the confines of the tokamak. If these magnetic reconnection events interact and disrupt the confined plasma field 904 at any given point along its path a system, failure occurs. If the confined plasma field 904 were a dipole field, these types of events would only affect mainly half of the total confined plasma's magnetic field at a given time; resulting in a reduced amount of the redirected photons from the confined plasma field.

In addressing the Tokamak's confined plasma field 904 being too weak to counter act any magnetic reconnection effects; magnetic strength is increased the more moving charged particles are stacked upon each other, which is why coiled magnets, dipole magnets, are mainly used for many heavy magnet applications. In FIG. 16 the confined plasma field 904 is traveling linear and creates a looped magnetic field instead of a dipole magnetic field within the confines of the Tokamak. Since magnetic fields are made of photons, the stronger the confined plasma's magnetic field, the more layers of magnetic photons are available to protect the integrity of the confined plasma during direct magnetic reconnection events. As long as the Tokamak and similar devices continue to push particles linearly within its supporting confinement magnets over given times, it will never create confined plasmas with strong enough protective magnetic field photons to counter act magnetic reconnection disturbances.

Figure 17:
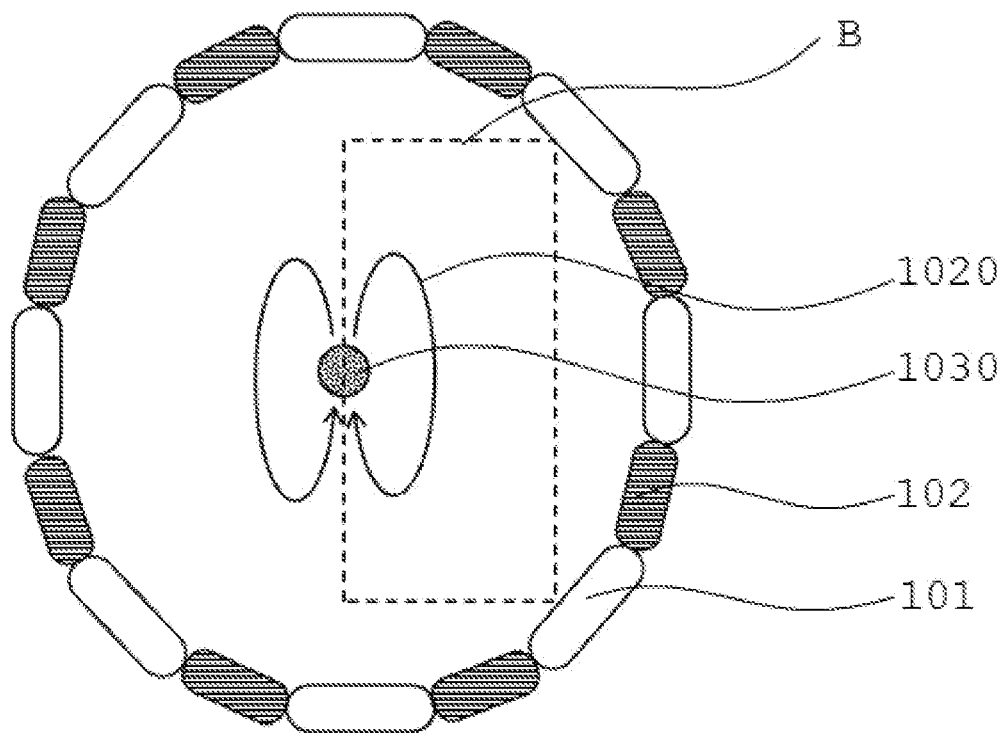
FIG. 17 is a cross-section depicting the conductive coils for the NESAR confinement system.
Figure 18:
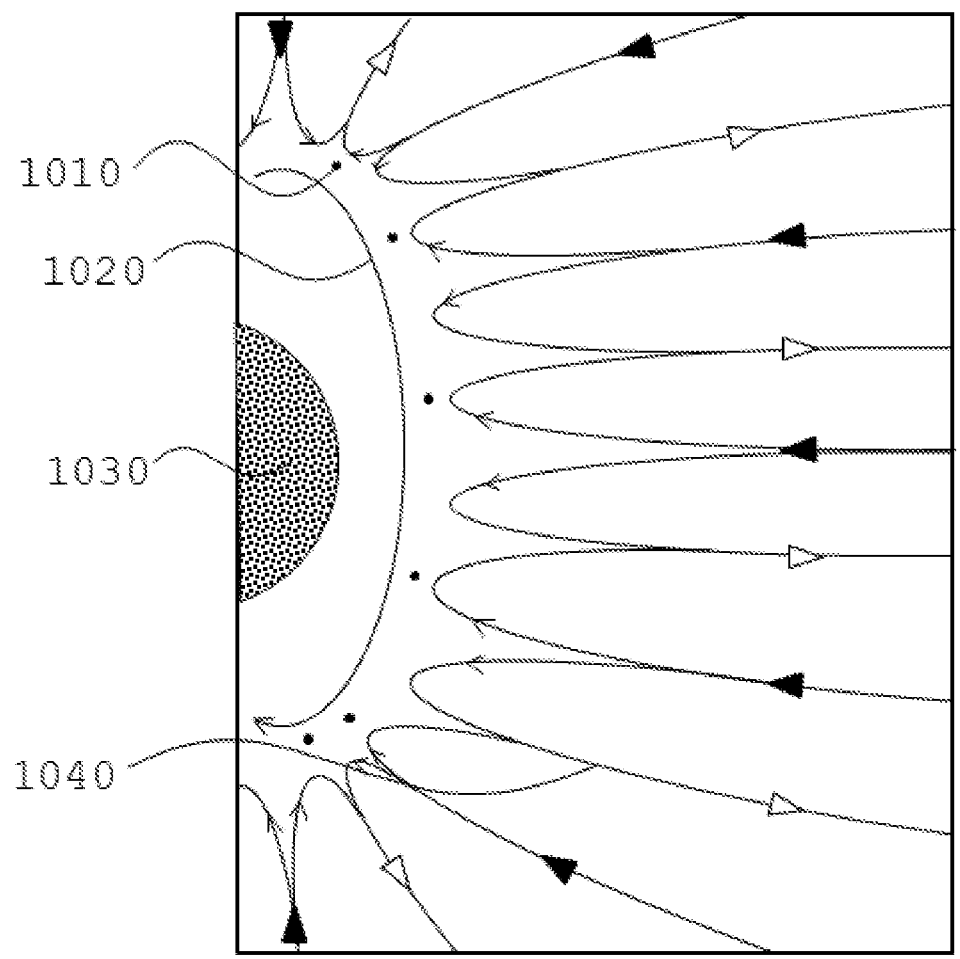
FIG. 18 is an enlarged cross-section depicting magnetic reconnection points within the NESAR confinement system.

FIG. 17 is a cross-section depicting the first sub-plurality of conductive coils 101 and the second sub-plurality of conductive coils 102 that are the main magnets that confine the particles within the NESAR confinement system 400. FIG. 18 is a cross-section magnification of the dotted box B in FIG. 17. In FIG. 18 the NESAR magnetic reconnection points 1010, NESAR confined plasma field 1020, NESAR confined plasma 1030 and conductive coil fields 1040 are depicted.

If magnetic reconnection is going to occur within the confinement apparatus 200, the way that the NESAR mitigates these magnetic reconnection events is by having the plasma confinement rotate about a confined center 601 within a single confine where all the confined plasma 1030 and particles can interact as a collective and create a solitary strong dipole magnetic field within the confinement apparatus 200. Due to rotating the confined particles about a confined center 601 within the NESAR confinement apparatus 200, stronger less energy consuming conductive coils, dipole magnets, can be used for a point focused confinement; instead of using massive energy exhausting super conductive magnets in linear configurations to confine particles and plasma like a tokamak. Due to the Tokamak's rotating particles in a ring shape without a true confined center 601, a system failure due to a magnetic reconnection event can occur at any location on the ring shaped confined plasma path. So, when analyzing the magnetic reconnection failure issues with tokamaks, one does not analyze the system as a whole, but instead the smaller cross-sections of confinement like FIG. 16.

The best way to think of the NESAR confining system 400 in producing confined plasmas with a stronger magnetic field than the Tokamak reactor is by imagining a Tokamak reactor confined plasma magnetic strength as a linear wire while the NESAR would be that same wire coiled. If the Tokamak rotates a single particle in its ring shape pattern once. This single rotation can be considered as single loop in a conductive coil. Once completed, the ITER will produce a plasma ring with a 6.2 meter radius. This means that a single particle will need to travel nearly 39 meters to make a single pass. Now if one wants to imagine the same situation within the NESAR confinement apparatus 200, the same particle will make multiple rotations in the same amount of time compared to the ITER. The NESAR allows particles to make more particle laps within the confinement apparatus 200; simulating a mass stacking, overlapping or coiling effect of these looped magnetic fields over the same amount of run time compared to ITER. In short, the NESAR confinement system 400 allows for the confined charged particles to simulate a small scale Magnetic Dynamo Plasma (MDP) state. In addition, this reduced distance in rotational travel, allows confined particles within the NESAR to work much more efficiently by producing much stronger dipole MDP like magnetic fields within its confines that are hotter and requires less energy to be sustained than the ITER.

When one compares the rotational distance for particles between the ITER and a much smaller NESAR confinement system 400, a particle within the NESAR may rotate hundreds to thousands of times before a single rotation for a particle is completed with the ITER. This means that each particle within the NESAR will produce a much stronger confined plasma field 1020 over a given time proportional to how many more rotations each particle can rotate over the same given time period relative to the ITER. This means that the NESAR utilizes the energy from each particle possibly more than a thousand times more efficiently than the ITER and other Tokamak models; which can allow for much lower energy levels needed to reach the break-even point that also allows for the NESAR to meet this energy goal at a much smaller size.

Once the NESAR confined plasma 1030 achieves an MDP like state within the confinement apparatus 200, the NESAR confined plasma field 1020 will interact with the confining conductive coil fields. The NESAR confined plasma field 1020 will mitigate magnetic reconnection disturbances in either one of two ways. First, it will reduce the effects of magnetic reconnection disturbances within the confinement apparatus 200, by creating a greater plurality of weaker NESAR magnetic reconnection points 1010 that would greatly lower the magnetic connection effects upon the stability of the NESAR confined plasma 1030. Second, it will reduce the effects of magnetic reconnection disturbances by the stronger NESAR confined plasm field 1020 bow shocking the magnetic reconnection effects to the outside surface of the confinement apparatus 200.

The first possible way of magnetic reconnection disturbance mitigation would be by using a greater plurality of confining conductive coils, with each conductive coil's magnetic field exerting a weaker magnetic field than the NESAR confined plasma field 1020. Depicted in FIG. 18 are 6 NESAR magnetic reconnection points 1010. Even though this is only a portion of the NESAR depicted, it presents more magnetic reconnection points that have a weaker magnetic field than the NESAR confined plasma field 1020 that will minimally affect the collective field of the NESAR confined plasma 1030. Since the NESAR confined plasma 1030 operates as a collective, the weaker magnetic fields of the NESAR magnetic reconnection points 1010 displayed do not affect the NESAR confined plasma 1030 at a cross-section like the tokamak. In the NESAR the magnetic reconnection strength is distributed amongst all of the conductive coils. If a NESAR's confinement apparatus 200 is built similarly to the one in FIG. 2, it will have about 50 conductive coils to distribute the strength of magnetic reconnection events. Magnetic reconnection disturbances within the confinement apparatus are mitigated on a multitude of factors by using a NESAR confined plasma 1030 with a much stronger magnetic field for protection and producing weaker magnetic reconnection events due to the ability to distribute strong catastrophic magnetic reconnection points to a plurality of lower strength events.

The second possible way of magnetic reconnection disturbance mitigation would be by the stronger NESAR confined plasma field 1020 within the confinement apparatus 200 creating a bow shock effect upon the conductive coil fields within the confinement apparatus 200. This effect would cause the NESAR confined plasma field 1020 to push upon the conductive coil fields 1040 within the confinement apparatus 200, forcing the interacting layers of conductive coil fields 1040 to the outside surface of the confinement apparatus 200. When this bow shock effect occurs, it will push magnetic reconnection events to the outside of the confinement apparatus that would result in pushing these disturbances outward and away from the NESAR confined plasma 1030. This type of bow shock effect would be similar to how the Earth experiences magnetic reconnection effects perpendicularly at the tail end of the Sun's magnetic field interacting parallel with Earth's magnetic field during coronal mass ejections. The confining coils would react similarly to the Earth as a magnetosphere. This bow shock effect is the more than likely magnetic reconnection event that would occur with the NESAR. This type of magnetic reconnection event would explain why we observe coronal mass ejections escaping from the surface of the sun.

The main mitigation to magnetic reconnection issues within a reactor would be reducing the energy needs of extremely powerful magnets to confine particles within the system. The interactions between these super magnets are the main cause of these magnetic reconnection events.

Magnetic Flux and Conservation of Angular Momentum of Sun and Planets Based on NESAR Model Many physicists forget that the Sun, even though a fusion machine, is still just an energy source that follows the laws of Faraday and Ohms. Nothing in our universe is stagnant. So, it is shocking why many physicists who know the law of conservation of energy quickly assume that the things that we observe are never an alteration to an original effect. Edgar Allan Poe said it best when he stated, "Believe Nothing You Hear, and Only One Half That You See", and this is how we should approach stellar observations. That being said, we have yet to observe a single physicist that has made the statement that we observe the induced magnetic effects of the Sun instead of direct. Induced effects are a product of conservation of energy, and the conservation of energy is altered by changing energies. We observe the opposing effect of the Sun's changing voltage due to magnetic fluxing, which shifts our observation of the Sun's magnetic field every 11 years. Based upon the NESAR confinement system 400, this phenomenon and more can now be fully explained.

The effects of the energy that we now observe from the Sun began billions of years ago, as our Sun perpetuated its initial energy by collecting and fusing free floating gases within our solar system. The fusion process creates energy that is measured by voltage and the Sun is basically a self-perpetuating battery that uses the Sun's changing magnetic flux as a pendulum to change the angle of approach 1110 for incoming particles towards the Sun's MDP core; that shifts the system's voltage back and forth about its operational voltage 1220 in the efforts to conserve the system's angular momentum.

Figure 19:
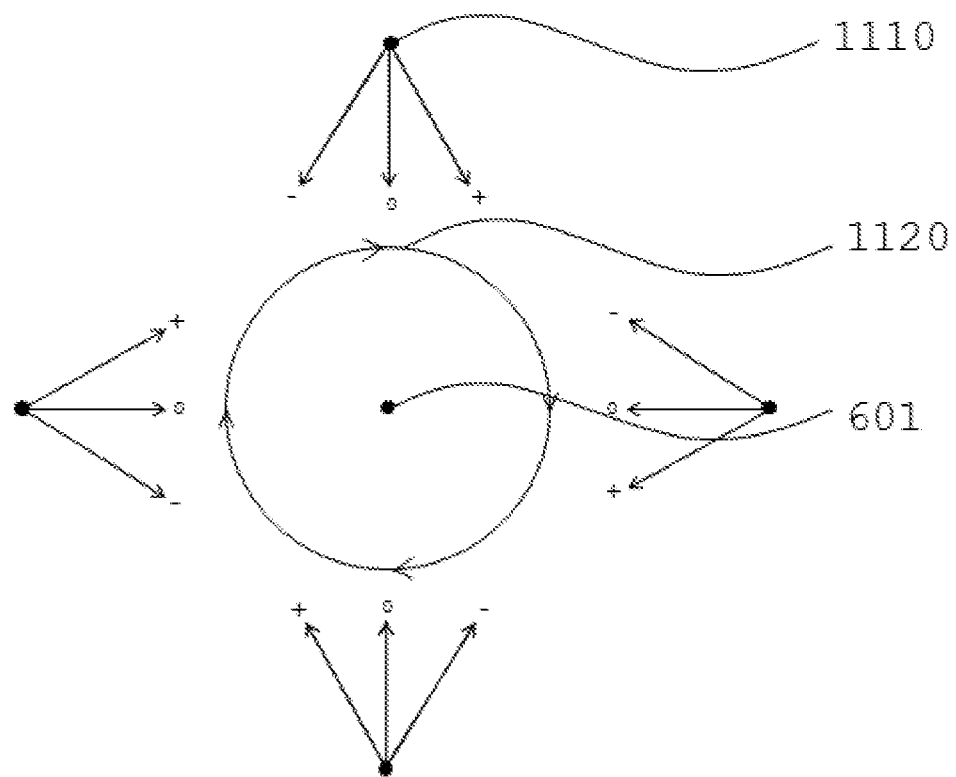
FIG. 19 is an illustration depicting how magnetic flux changes affect the Sun's operational voltage.

In general, the rate at which particles approach the MDP core is constant, which allows for a pretty constant fusion rate. The factor that changes the system's voltage and allows for conservation of angular momentum to perpetuate the fusion process within the Sun is the changing induced magnetic flux effects upon particle angles of approach 1110 (shown in FIG. 19). FIG. 19 depicts the effect that a changing magnetic flux has on the voltage change of the Sun's operational voltage rotation 1120. The effects of magnetic flux are not a negative or a positive reaction, but merely an opposing direction of magnetic photons fighting against an original changing source to conserve energy. That being said, to explain FIG. 19 a positive magnetic flux in this situation will yield a clockwise angle of approach 1110, while a negative magnetic flux will yield a counter-clockwise angle of approach 1110. If the system's magnetic flux is zero, the angle of approach 1110 is zero and particles approach the system's core directly head on. The operational voltage rotation 1120 is the rotational speed that the Sun's MDP core holds when it has a magnetic flux of zero, and the voltage that the Sun has when its magnetic flux is zero is the operational voltage 1220 (shown in FIG. 20). The operational voltage 1220 is the voltage level that the Sun's actual voltage level at a given time perpetuates about to conserve its energy.

Since the Sun is basically a perpetuating battery, it's best to explain its function as if it were a 12 volt battery. The following figures used in comparing our Sun to a battery in terms of voltage and RPM are not the actual voltages and RPMs for our Sun; these figures are only used to simplify the relationship between the two. A fully charged 12 volt battery usually carries a charge around 12.8 volts, while a dead one is around 12.0 volts. So, the 50% level of this battery would be around 12.4 volts. For explanation purposes in FIG. 19, the Sun's operational voltage 1220 where magnetic flux is zero is at 12.4 volts, and at this voltage the Sun's MDP core's particles rotate at a rate of 1000 RPMs. As the Sun's magnetic flux increases towards a positive, an increased angle of approach 1110 is placed upon the core's confined center 601. This clockwise angle of approach 1110 would increase the RPMs of the system to a limit stopped by the conservation of angular momentum. If the RPM level of the operational voltage rotation 1120 is increased to 1100 RPMs, it yields 12.6 volts prior to a negative magnetic flux in the counter-clockwise direction reduces the operational voltage rotation 1120. As the negative magnetic flux shifts particles angle of approach 1110 in the counter-clockwise direction; the RPMs of the operational voltage rotation 1120 reduces to a minimum of 900 RPMs that yields 12.2 volts before the magnetic flux shifts the angle of approach back to a positive clockwise angle of approach 1110.

Based upon the NESAR model, one can view the NESAR's first sub-plurality of conductive coils 101 as the feature that sets the operational voltage 1220. The second sub-plurality of conductive coils 102 is the feature that creates an angle of approach 1110, so that angular momentum can be utilized in enhancing the confinement and stabilization of the system. Our Sun may not have a feature like the second sub-plurality of conductive coils 102, but due to the sized of the system and the extended distance of particle approach towards the confined center 601 the magnetic flux has a greater effect in changing the angle of approach 1110 within our Sun. A small system like the NESAR, does not have the luxury of solely using changing magnetic flux to increase or decrease an angle of approach 1110. So, angled conductive coils like the second sub-plurality of conductive coils 102 are necessary to augment the angle of approach 1110 and utilize the benefits of using angular momentum to improve confinement.

Figure 20:
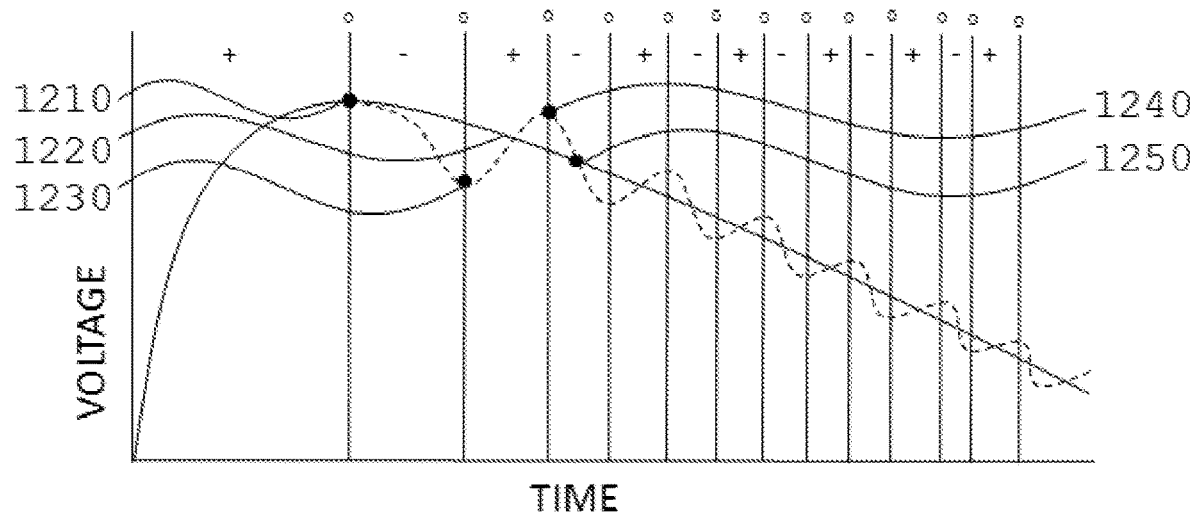
FIG. 20 is a graph illustrating the pendulum effects of changing magnetic flux upon the Sun's operational voltage.

FIG. 20 is a graph that ambiguously depicts how shifting magnetic flux has perpetuated changing angular momentum and voltage in a pendulum effect about the operational voltage 1220. In the beginning stages of our Sun's formation, the voltage of the system continually increased until it leveled off to a first maximum voltage point 1210 that had a zero magnetic flux. During the Sun's initial increase in voltage change, a magnetic flux was induced that was in result of this changing increase. This initial magnetic flux is the facilitator for the magnetic flux shifting that perpetuates the functionality of the Sun's voltage shift about its operational voltage 1220. In FIG. 20 this initial magnetic flux is shown with a positive sign. From the first maximum voltage point 1210, the magnetic flux switches to a negative and diverges into two types of voltage.

The magnetic flux voltage, depicted as a dotted line, is the actual measurable voltage at a given time that is affected by magnetic flux.

The operational voltage 1220 is the voltage level that a system tries to maintain through conservation of energy. Even though FIG. 20 shows the operational voltage 1220 gradually reducing its voltage over time; this may not be the fact if the electron confinement for a star system is at or nearly 100% efficient. If the star's electron confinement is at or nearly 100% efficient then the star system may yield a steady or increasing operational voltage 1220.

The negative magnetic flux reduces the system's voltage to a first minimum voltage point 1230 where conservation of angular momentum takes effect and produces a positive magnetic flux. The angular momentum of this positive magnetic flux accelerates the system's voltage higher than the operational voltage 1220 to a new second maximum voltage point 1240 that is less than the original first maximum voltage point 1210.

The main idea to take away from FIG. 20 is there is a direct correlation between how the Sun's MDP core and a simple DC armature perpetuates rotational motion. Where the magnetic flux is zero, the flux voltage is the furthest away from it operational voltage 1220, which uses this potential energy to accelerate toward an operational voltage 1220. By the time the magnetic flux voltage matches the operational voltage 1220 at match point 1250 its voltage change rate is maximized. This means at match point 1250, the effects of magnetic flux are maximized between shifts at this point which carries the momentum of the voltage to settle at another peak. Our Sun and stars have two different observable changing energy effects occurring within its MDP core; the magnetic fluxing of confined electrons as described in FIGS. 19 and 20, and the fusion process creating neutrons, neutrinos, helium and other particles. Of these two observable types of energy the magnetic flux effects on the Sun's electron confinement voltage is the reason that we observe its magnetic poles flip every 11 years.

Possible Aharonov-Bohm Effects on Celestial Observations

It was recently believed that linearly traveling photons/light trajectories could not be influenced by outside magnetic or electric influences. Due to the recent discovery of the Aharonov-Bohm effect, where changes in magnet flux can influence the trajectory of traveling photons, it may be possible that all stars and most planets obtain a changing MDP that produces shifting magnetic fluxes that may be influencing some of our celestial observations. This belief may be contrary to most who believe that observable celestial interruptions in photon travel are due strictly to gravitational effects.

An example of a notable celestial observation that may need to be questioned in its validity in gravitational effects is the phenomenon of gravitational lensing. This is the phenomenon when light bends around large gravitational fields, like the sun. This phenomenon was used to prove Einstein's theory of Curved Space Time for his theory of General Relativity, but this effect may be due more or completely to shifting magnetic fluxes of the MDPs within these large celestial bodies instead.

Figure 21:
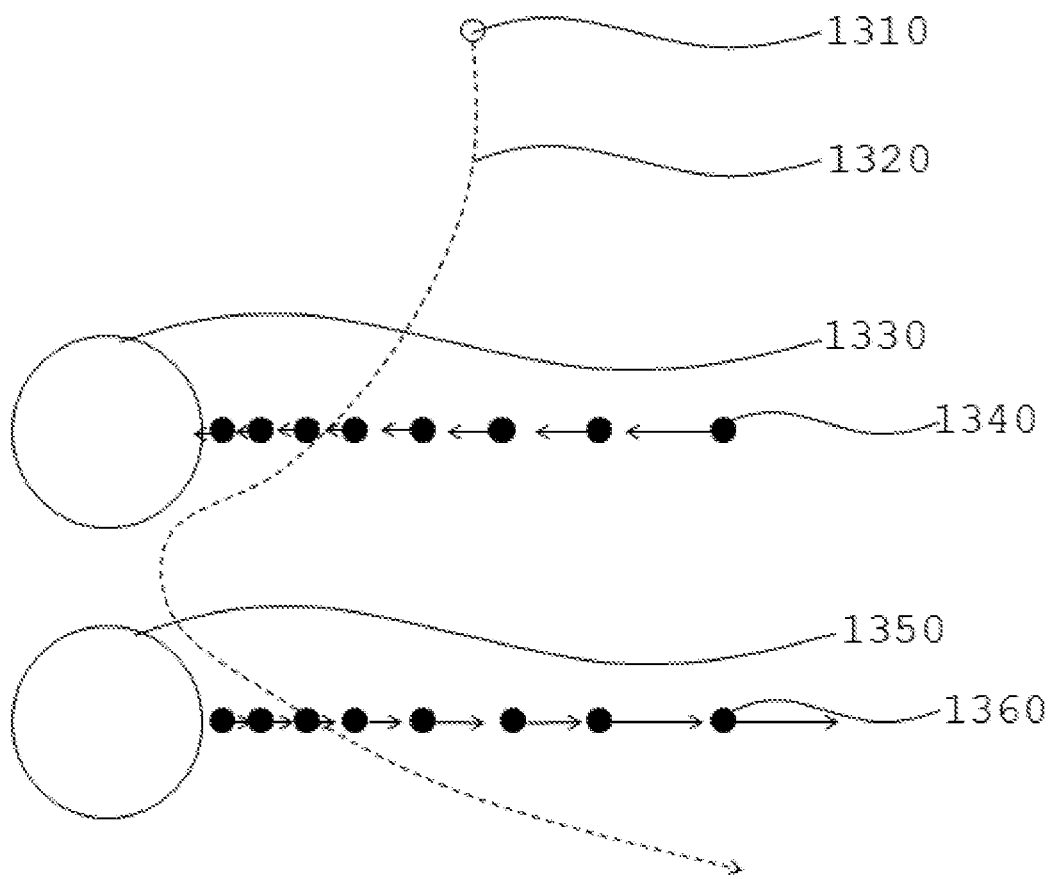
FIG. 21 is an illustration of theory on photon interaction during Aharonov-Bohm effect.

Currently a clear explanation on why the Aharonov-Bohm effect happens has not been fully explained. Since magnetic fields are made of magnetic photons the Aharonov-Bohm effect is more than likely due to the photons that make up an MDP magnetic field interacting directly with surrounding free moving photons as magnetic flux changes occur in an MDP. In FIG. 21 a depiction of this theory is shown. A photon 1310, as light, is on a southward photon path 1320. This photon path 1320 is depicted as a dotted line. As the photon nears the influence of a rapidly increasing magnetic flux field 1330, the inward moving magnetic photons 1340 directly interact with the photon 1310, drawing it nearer to the increasing magnetic flux field 1330. As the photon 1310 approaches a rapidly decreasing magnetic flux field 1350, the outward moving magnetic photons 1360 directly interact with photon 1310 as the rapidly decreasing magnetic flux field 1350 that is simultaneously accelerating to a zero voltage. FIG. 21 is not an example of how the electromagnetic fluxing occurs in stars, because causing an outward movement of magnetic photons should not occur upon a stable star. If a NESAR like reactor is constructed to rapidly change its total MDP voltage, this action would result in the Aharonov-Bohm effect. A modified NESAR device like this could possibly have the added function of Photonic Cloaking. In Photonic Cloaking, the observable reflected and refracted light/photons of an object could be restricted or altered by controlling the surrounding non-field photons to augment an observer's perspective.

Gravitational Field Effects by Curving Quantum Particles in the NESAR

Figure 22:
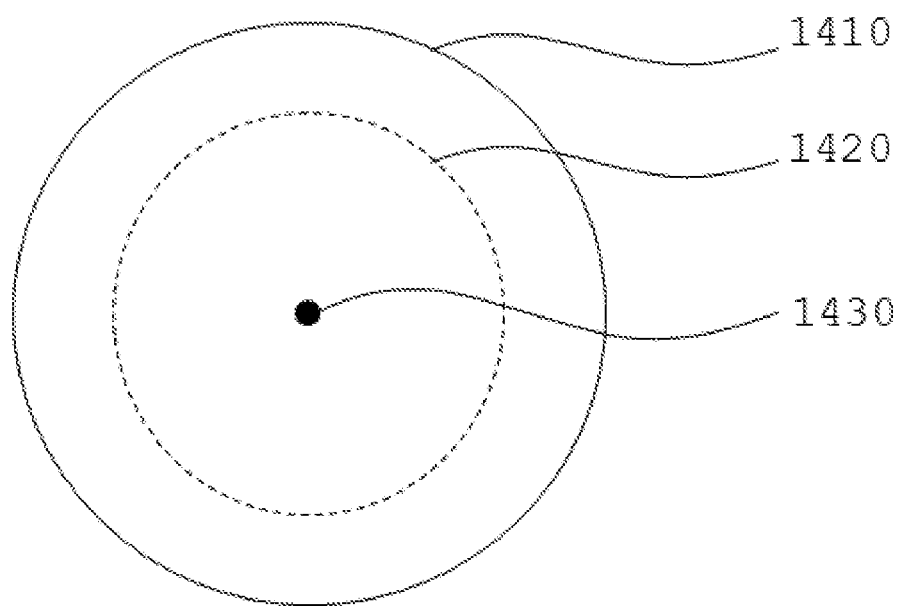
FIG. 22 is an illustration of a hydrogen atom with a central nucleus and surrounding electron.

All atomic matter has its own gravity effect. What can then be assumed is that every atom produces this weak interaction. FIG. 22 is the structure of the hydrogen atom with a central nucleus and surrounding electron. This image depiction is based upon the latest atomic models. The maximum radial probability of the electron location 1420 for this hydrogen atom is depicted with a dotted line located within the outer most electron radial orbit 1410 and outside of the nucleus 1430 at the atomic center.

The most significant property that allows the atom to obtain gravitational properties is its ability to move particles, especially electrons, within its field of influence perpendicular to its nucleus. This nucleus being the center of particle rotation; results in the protons, neutrons, and electrons rotating in a spherical shape. The ability to curve and rotate charged, and possibly neutralizing, particles in the same or similar direction around a common rotation point in a spherical shape over time, will allow for the factors of curved space time to create gravitational effects.

The way to produce different field influences through particle movement can be better understood if these fields are not brought upon by certain charged particles, but instead how the particles move overtime in producing linear and geometric shapes. Currently, man has only been about to utilize three different types of field influences. First, zero movement of charged particles producing linear field effects. Second, linear movement of charged particles producing oscillating magnetic fields. Third, coiled movement of charged particles producing dipole magnetic fields.

Figure 23:
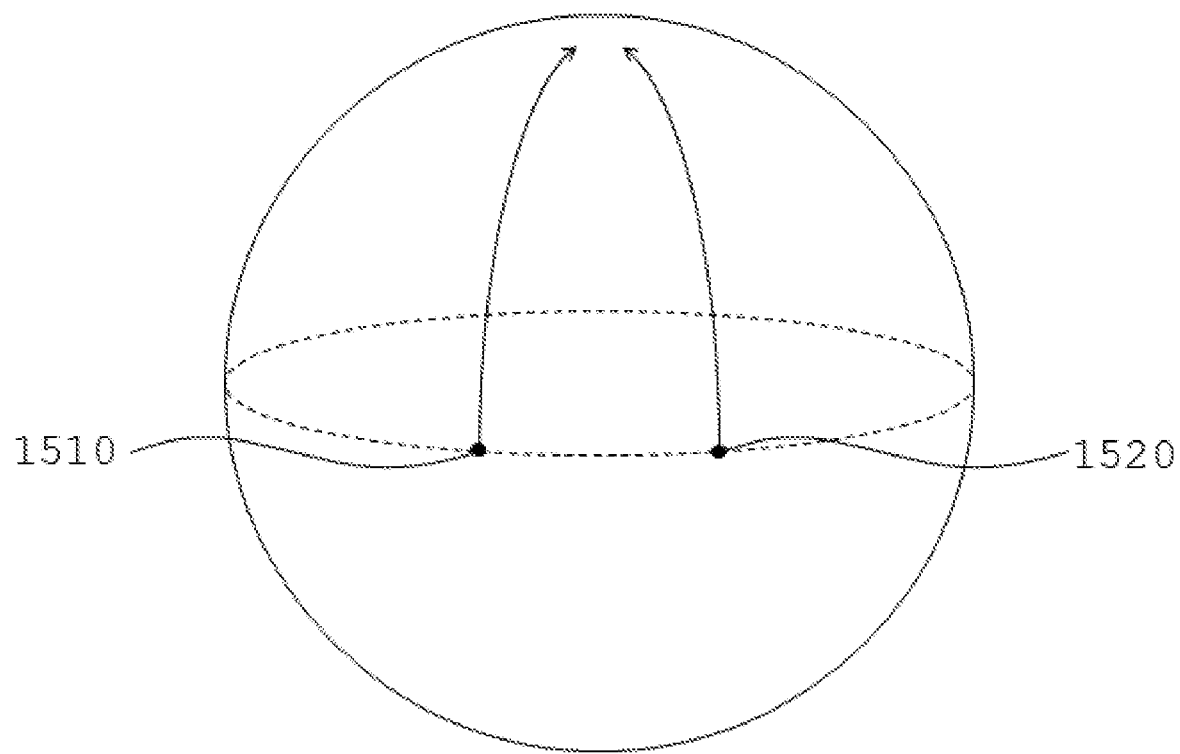
FIG. 23 is an illustration depicting geodesic deviation on a sphere.

Since the NESAR accelerates particles in a common/similar curved direction in a spherical shape relative to confined center 601 over time, the time space effects of Geodesic Deviation can influence the moving charged particles within the NESAR to produce a gravitational field effect. Geodesic Deviation is the effect of parallel moving objects upon a curved surface to approach or recede from one another. FIG. 23 depicts object one 1510 and object two 1520 moving parallel northward from the equator on the surface of a spherical object. On a curved surface, as these object move parallel they will approach each other and eventually cross. In observing this phenomenon, these objects approaching each other are not coming closer to each other due to a physical force, but instead by the effects of incorporating curved parallel movement into space time. The NESAR confinement system enables copious pluralities of Geodesic Deviation effects among like charged, opposite charged, or neutralizing particles to produce measurable gravity effects.

Figure 24:
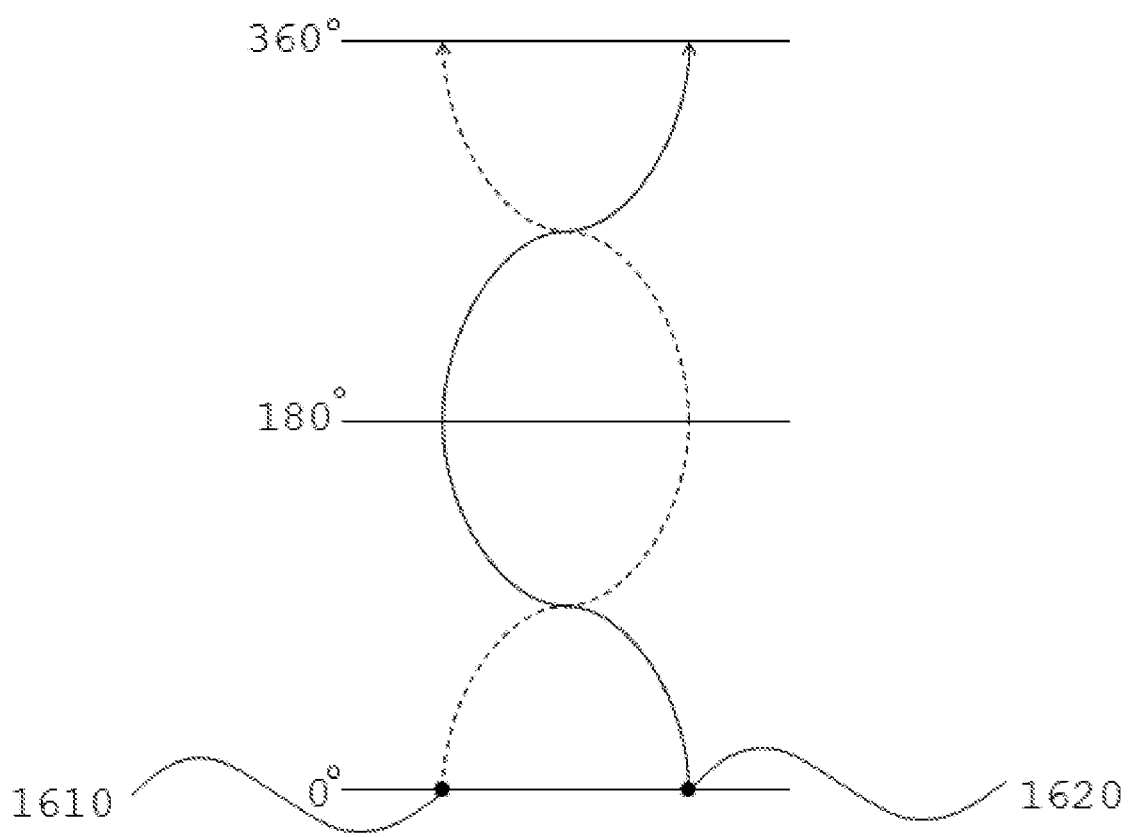
FIG. 24 is an illustration depicting particles charged oppositely and neutrally interacting through geodesic convergence in a curved spherical trajectory.

FIG. 24 is an illustration of particle one 1610 and particle two 1620 that act oppositely charged or neutral upon each other within the NESAR, that enables Geodesic Deviations to converge them closer without amalgamating. Due to the simulated force of these particles converging, this effect must be accounted for by creating an inward field effect. This field effect may create what many speculate to be as gravitons. As multitudes of layers within the NESAR create copious pluralities of similar interactions as shown in FIG. 24, the inward field affects increases and results in observable gravity.

Figure 25:
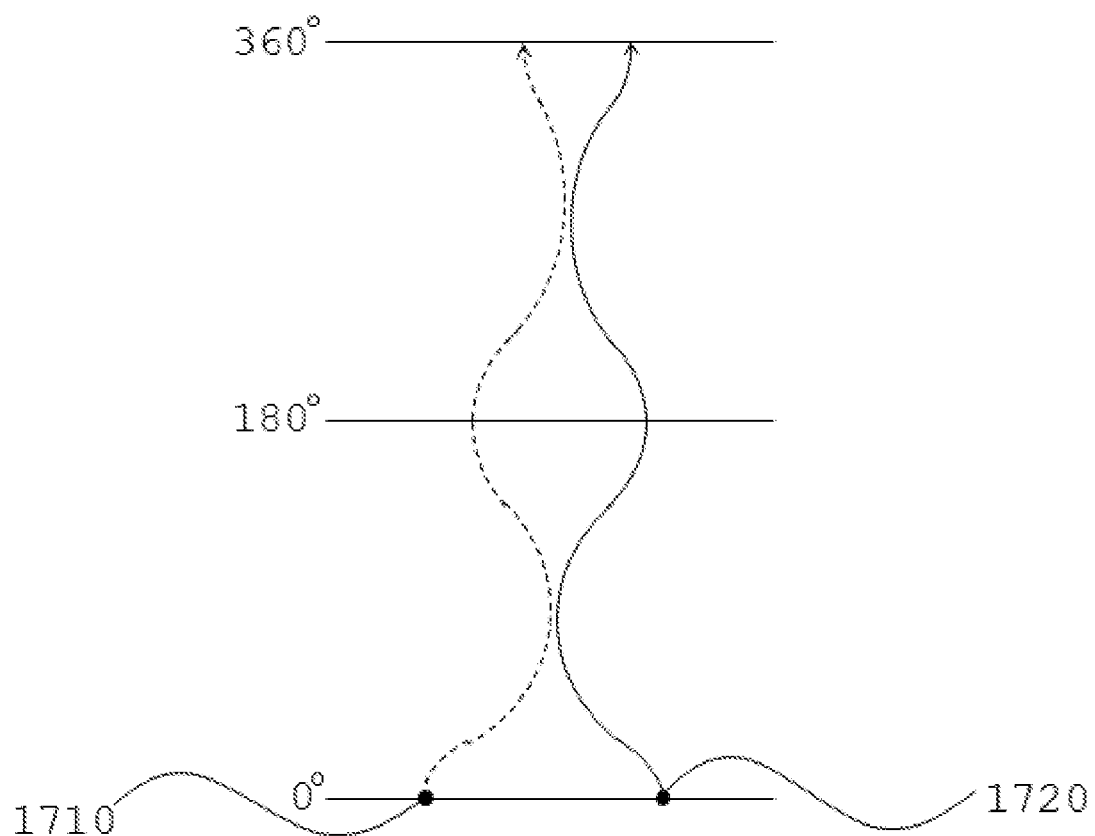
FIG. 25 is an illustration depicting like charged particles interacting through geodesic convergence in a curved spherical trajectory.

FIG. 25 is an illustration of two like charged particles, electron one 1710 and electron two 1720, interacting within the NESAR resisting Geodesic Deviations to occur. Again, due to the simulated forces of geodesic deviations these particles converge, but in this situation the like charges repel each other. This repulsion to geodesic convergence creates an energy void that must be compensated for. This energy filling effect is the gravitational effect. More than likely the interactions between confined like charged particles, electrons, within a system are the most probable way gravitational effects occur.

If gravity effects are created by geodesic effects upon oppositely charged or neutral acting particles, then the creation of black holes can be explained by a system being injected with gradual large amounts of positrons. The interaction between rotating electrons, negative charge, and positrons, positive charge, have the same mass and attract to each other; uniformly and rapidly accelerating the Geodesic Deviation effects within the system. In addition, once these particles combine, they produce a high energy gamma photon. Normally a photon would not be able to be confined by normal magnetic forces, but due to the accelerated increase of magnetic flux rate of change, the Aharonov-Bohm effects assist in the confinement of the newly formed gamma photons and perpetuate geodesic effects until it decays back into an electron and positron again to repeat this accelerated process.

If gravity effects are created by geodesic effects upon like charged particles, then the creation of black holes can be explained by a system being injected with gradual large amounts of electrons. If this type injection occurs in a system's confinement that allows for little to no electrons escaping from its confinement, then the rapid acceleration of geodesic effects will occur within the system. Along with this, the accelerated increase of magnetic flux rate of change will cause the Aharonov-Bohm effects with approaching photons.

Shockingly, this would mean that any star that is traveling through space that encounters a large steady stream of positrons or electrons would rapidly, relative to other stars, appear to a collapse and transform into a black hole state. The reason that it appears to collapse and transform into a black hole is for the simple reason that was discussed before; that magnetic flux is distorting photon light travel which may be altering our true perception of what is occurring more than the effects that could be due to gravity. If the NESAR is similar to the true functionality of a star, then an accelerated rate of induced magnetic flux from large amounts of interacting positrons and electrons injected within a star system may be the main factor for the appearance of a black hole instead of the gravity effects. The gravity effect mainly shapes the phenomenon as a spherical/circular shape to the observer, while interacting light photons are gradually deviated closer to the center of the black hole by interacting photons from the induced magnetic flux accelerating inward.

If black holes are created in this fashion it would mean that black holes may not be a true singularity, but instead a spiraling collection of charged particles creating massive increases in magnetic flux rate changes that are altering our perception of that area of space. Since the geodesic effects increase at faster rates, the effects of gravity will also increase at faster rates. Looking at a black hole as a system similar to the NESAR confinement system 400 may allow for Einstein's mathematics for general relativity to fully calculate the measurements of these black hole phenomena, because Einstein's theory fails to explain gravity as respect local energy-momentums, which may be measured through a NESAR type star model.

In the latest studies on black holes, black hole V404 yielded a much lower magnetic field than expected for the system, which may add more evidence supporting the theory in induced magnetic flux rate of change effects on light photons interacting with these types of systems. Induced magnetic flux rate of change effects as a reason why interacting light does not escape black holes holds true to Einstein's theory that nothing travels faster than the speed of light. But if faster than light travel is possible, having a NESAR like system interacting with different particles to create possible new and different types of geodesic deviation fields is the key in manipulating space time to travel faster than light for space travel.

The two best things about a NESAR type confinement system that is able to simulate black hole effects is that these simulated effects are controllable and are able to be turned on and off, as well as this device possibly being used for controlling photons to create a possible Photonic Cloaking device.

Most physicists believe that gravity effects are created by some balance of charged particles neutralizing upon each other. Instead they should be concerned about particle movement and how different movements can manipulate effects upon space and time. Curving charged particles in a spherical shape will only add another effect, the gravity effect, which has not yet been utilized or understood by man. Once man fully understands particle shaping and its full effects, I believe that the utilization of gravity effects is just the beginning of unlocking many more amazing achievements.

Possible Anti-Gravitational Field Effects of the NESAR

For the first time in recent years scientists have observed a phenomenon called gravitational waves, a phenomenon predicted to exist by Einstein, from two neutron stars merging closer as time persists. Based upon the previous presentation of converging or inward Geodesic Deviation fields creating gravitational effects, diverging or outward effects of Geodesic Deviation will produce an Anti-gravitational field effect. If the theory is right and stars function similar to a NESAR confinement system 400, then what scientist have observed as gravitational waves are actually observations of outward geodesic deviation effects commonly referred to as anti-gravity. If this is true, then this would account for observed so called gravitational waves occurring randomly without any pattern of occurrence.

Figure 26:
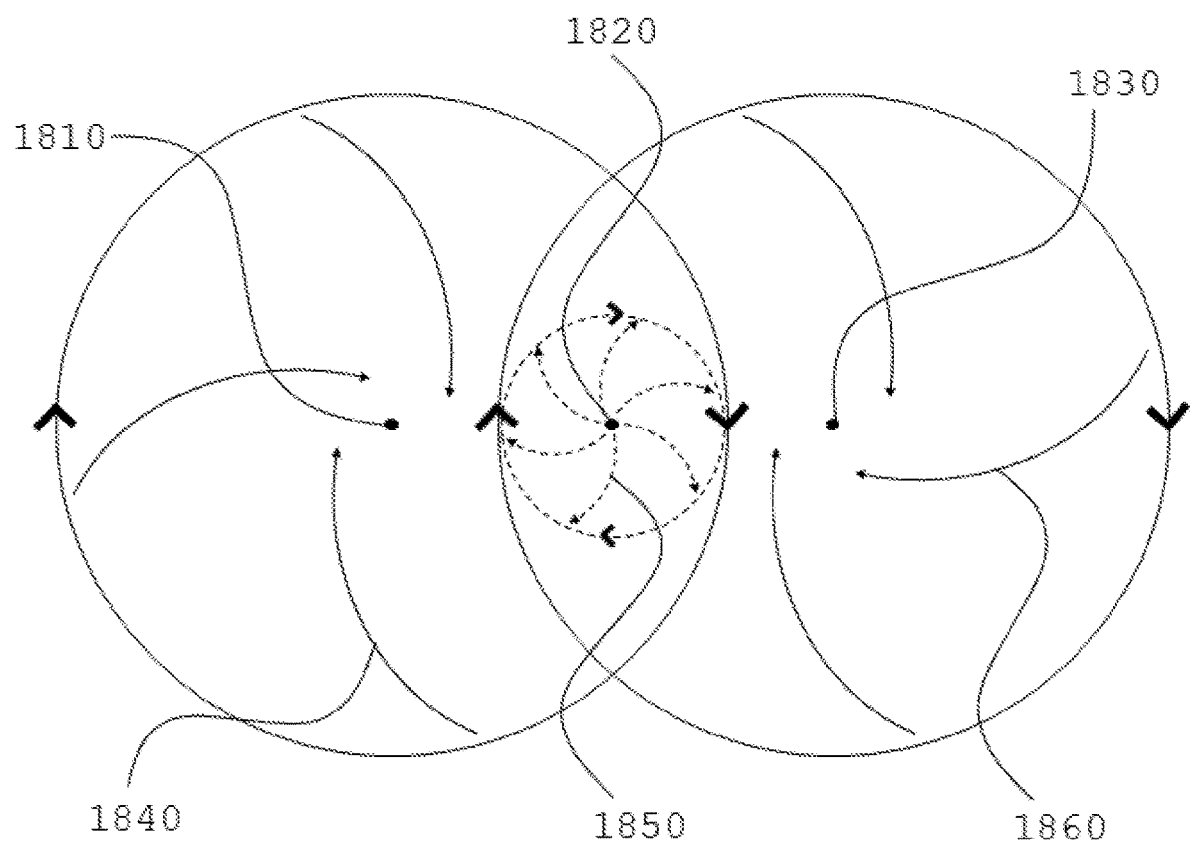
FIG. 26 is an illustration depicting the two neutron stars merging to produce outward geodesic divergence that may produce anti-gravitational effects that we have observed as gravitational waves.

FIG. 26 depicts the particle effects occurring within each of the two neutron stars merging closer based upon the NESAR model. Neutron star alpha's 1810 gravitational field on the left is interacting with the neutron star bravo's 1830 gravitational field on the right. Inward geodesic deviation fields 1840 for alpha 1810 and inward geodesic deviation fields 1860 for bravo 1830 create a common rotation point, charlie 1820, with outward geodesic deviation fields 1850. This common rotation point, charlie 1820, causes observable anti-gravitational effects between these two neutron stars.

Anti-gravity effects can be created by the NESAR in two ways. The first method of creating an anti-gravity effect with the NESAR would be by reversing the cathode and anode configuration creating voltage potential from the original setting by having the confinement apparatus 200 as the cathode and the original electron discharger 407 as the anode. Once a voltage potential is established, use the injectors 406 to inject anti-hydrogens or similar anti-isotopes instead of the original fuels used in the NESAR's initial configuration. The rotating of curved ionized positrons and anti-hydrogen isotopes with naturally opposing oscillations compared to the original NESAR set up not using anti-matter; will yield similar geodesic deviation effects resulting in an opposing geodesic deviation field vector projected outward instead of inward.

Figure 28:
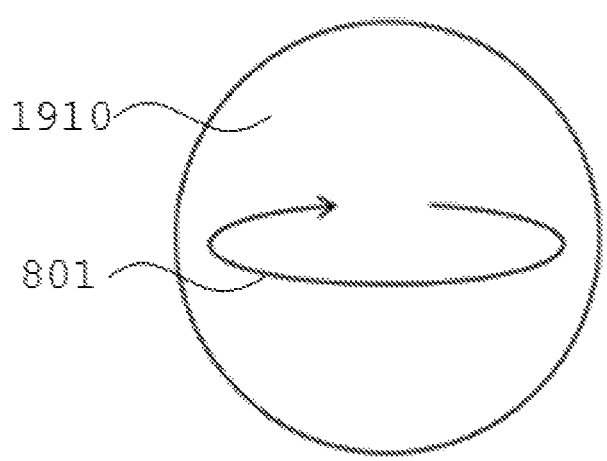
FIG. 28 is an illustration depicting the confined plasma shape and rotation resulting from all of the first sub-plurality of conductive coils with equal electromagnetic field strength.

The second method of creating an anti-gravity effect with the NESAR would be by generating stronger magnetic fields from the first sub-plurality of conductive coils 101 about the axis of rotation and equator of the confinement apparatus 200 to produce concavities upon the confined rotating plasma that results in diverging geodesic deviations. FIG. 27 is a side cross-section view of the NESAR confinement apparatus 200 rotating in a second rotational direction 802 illustrating equal magnetic field strength amongst all of the first sub-plurality of conductive coils 101. FIG. 28 depicts the confined plasma shape 1910 produced by having equal magnetic field strength amongst all of the first sub-plurality of conductive coils 101; which results in a spherical confined plasma shape 1910 rotating in a first rotational direction 801. This confined plasma shape 1910 with common particle rotation should yield gravitational effects from converging geodesic effects upon the confined plasma particles.

Figure 29:
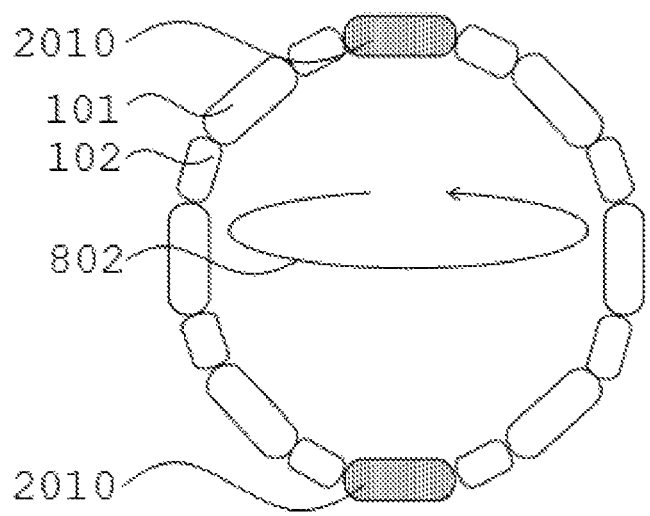
FIG. 29 is an illustration depicting the NESAR confinement apparatus with the first sub-plurality of conductive coils located on the axis of rotation having stronger magnetic field strength.
Figure 30:
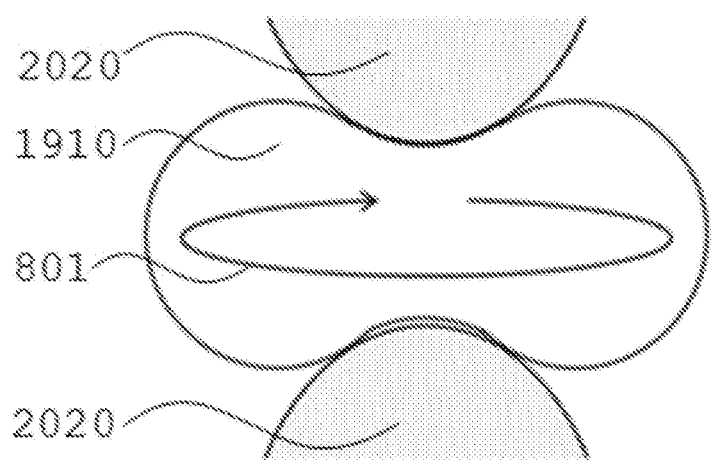
FIG. 30 is an illustration depicting the confined plasma shape and rotation resulting from the first sub-plurality of conductive coils located on the axis of rotation having stronger magnetic field strength.

FIG. 29 illustrates a side cross-section view of the NESAR confinement apparatus 200 rotating in a second rotational direction 802 with stronger axis of rotation magnetic fields 2010. FIG. 30 depicts the confined plasma shape 1910 produced by having stronger first sub-plurality of conductive coils 101 located on the axis of rotation. Which results in a horizontal hourglass confined plasma shape 1910 rotating in a first rotational direction 801. This horizontal hourglass confined plasma shape 1910 with common rotation should yield gravitational and anti-gravitational effects from diverging and converging geodesic effects upon the confined plasma particles. Axis of rotation anti-gravitational effects 2020 occur where the confined plasma shape 1910 experiences sustained concavity; which causes diverging geodesic effects upon the confined plasma particles located on the top and bottom of the confined plasma shape's 1910 axis of rotation. Since converging geodesic effects upon the confined plasma particles still occur at the equator of the confined plasma shape 1910; gravitational effects will still occur at this region.

Figure 31:
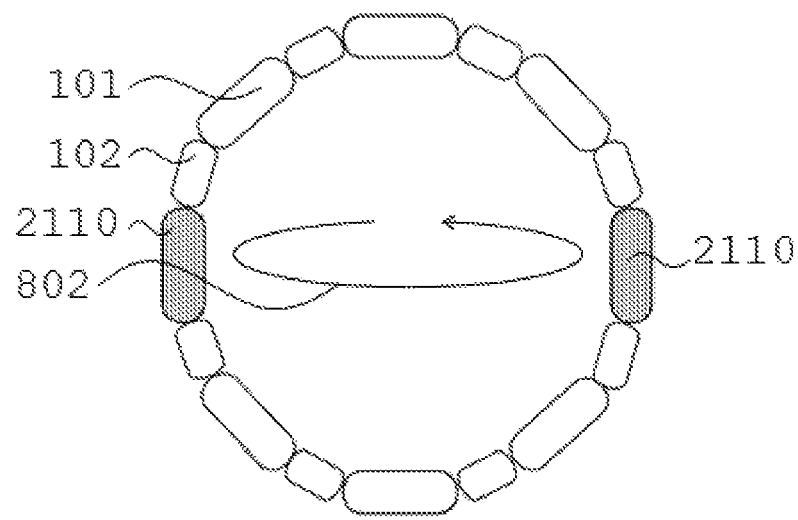
FIG. 31 is an illustration depicting the NESAR confinement apparatus with the first sub-plurality of conductive coils located on the equator having stronger magnetic field strength.
Figure 32:
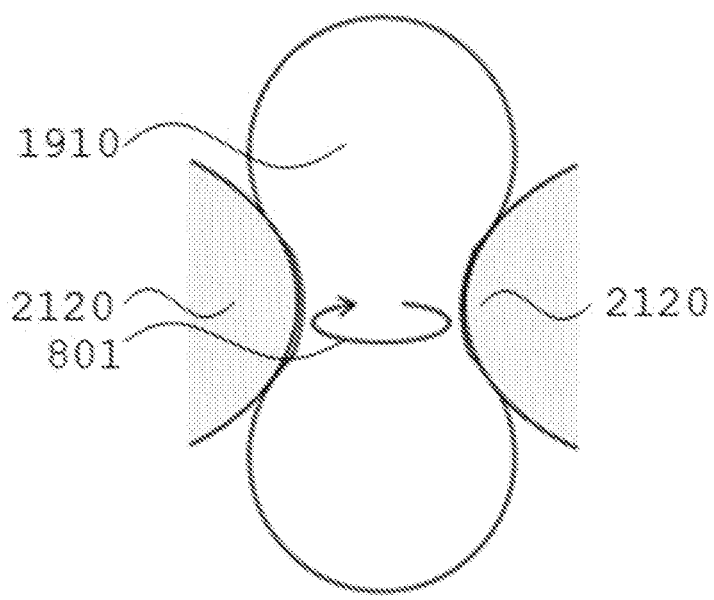
FIG. 32 is an illustration depicting the confined plasma shape and rotation resulting from the first sub-plurality of conductive coils located on the equator having stronger magnetic field strength.

FIG. 31 illustrates a side cross-section view of the NESAR confinement apparatus 200 rotating in a second rotational direction 802 with stronger equator magnetic fields 2110. FIG. 32 depicts the confined plasma shape 1910 produced by having stronger first sub-plurality of conductive coils 101 located on the equator. Which results in a vertical hourglass confined plasma shape 1910 rotating in a first rotational direction 801. This vertical hourglass confined plasma shape 1910 with common rotation should yield gravitational and anti-gravitational effects from diverging and converging geodesic effects upon the confined plasma particles. Equator anti-gravitational effects 2120 occur where the confined plasma shape 1910 experiences sustained concavity; which causes diverging geodesic effects upon the confined plasma particles located on the equator of the confined plasma shape's 1910 rotation. Since converging geodesic effects upon the confined plasma particles still occur at the top and bottom of the confined plasma shape's 1910 axis of rotation; gravitational effects will still occur at these regions.

Incorporating the concepts from FIGS. 29, 30, 31 and 32 into the NESAR confinement system 400, a NESAR like system could be used for anti-gravity propulsion by coupling the NESAR confining apparatus 200 horizontally to a rotating turret. Once this is done, controlling the magnetic field strength of the stronger equator magnetic fields 2110 can affect altitude; while controlling the magnetic field strength of the stronger axis of rotation magnetic fields 2010 can be used for directional thrust, with the assist of a rotating turret.

Figure 33:
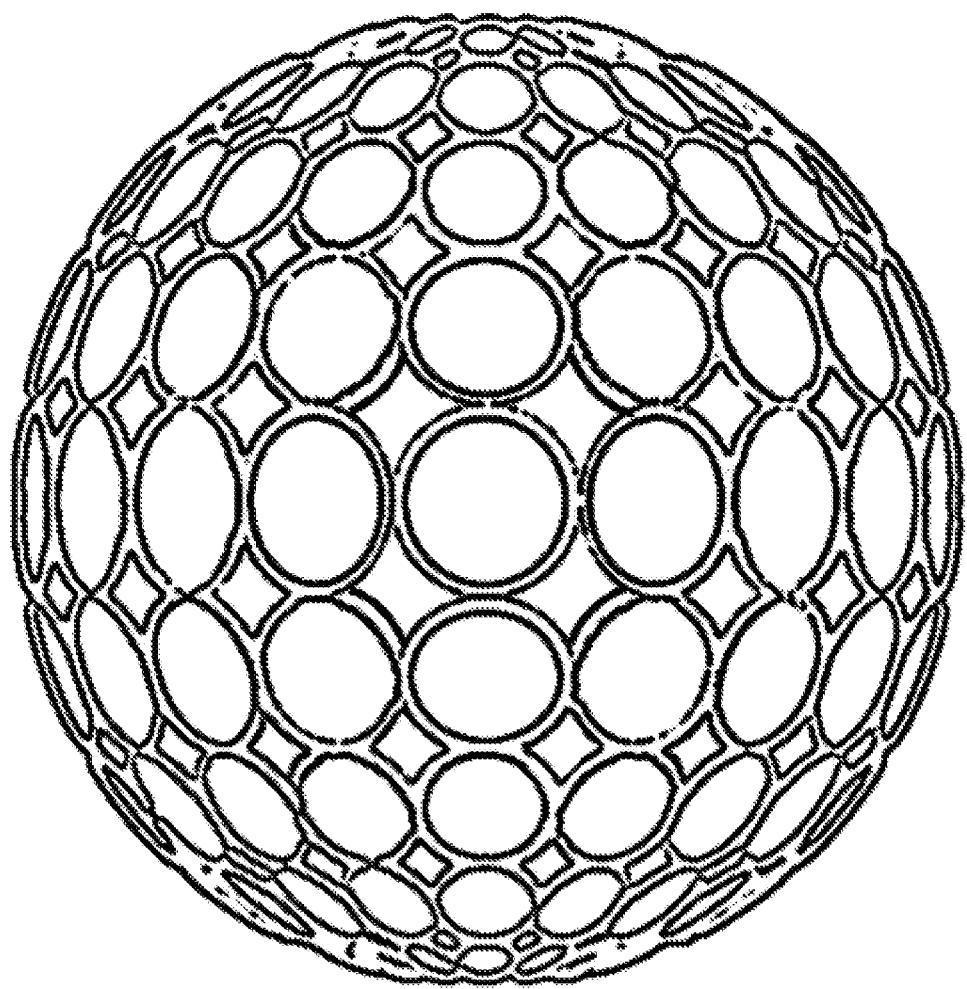
FIG. 33 is an illustration of an alternative confinement apparatus design.

FIG. 33 illustrates an alternative confinement apparatus design. Specifically, FIG. 33 illustrates a plurality of equally sized coils arranged in a sphere pattern rather than the pentafoil pattern illustrated in FIG. 1.

Gamma Photonic Ray

From the previous discussion positrons and electrons interact to produce gamma photons. If the NESAR is used in the confinement of electrons and a beam of positrons are injected to the center of the confinement apparatus; a steady stream of directed gamma photons, rays, will emit in the direction away from where the positrons are initially injected into the system. This allows for a NESAR like system to be used for utilizing powerful gamma photons, rays, for usable needs.

CONCLUSION

The NESAR confinement system 400 is a system that is an integration of the studies and concepts of general physics, fusion, electromagnetic theory, quantum mechanics, plasma physics, astronomy and general relativity. This is the world's first fusion reactor that is truly meant to replicate the actual functionality of our own Sun, along with possibly creating the effects of gravity. There are multitudes of different fusion reactor concepts in existence, but none of them are designed to function like the Sun or come close to meeting the goal of surpassing the breakeven point.

The Sun is a rotating spherical fusion reactor that is continually changing and has the properties of electricity, magnetism, ionization, plasma and gravity. It is for this reason that induced magnetic flux is the driving factor that perpetuates our Sun's existence. The induced magnetic flux forces the Sun's confined particles to rotate in a curved path that produce geodesic deviating gravitational effects. The Sun's ionizing and gravitational effects then work in conjunction to perpetuate its existence by using long range gravity effects to attract neutral atoms close enough for the short range ionization process to feed its fusion process.

The NESAR is the only fusion reactor concept that incorporates all of the driving factors that perpetuates the Sun's existence into its own design. For this reason, the probability of the NESAR surpassing the break-even point while presenting gravitational effects is high likely because it is based off an already working system. Due to the possible overwhelming benefits that could be achieved by the NESAR, it is imperative to build a prototype as soon as possible. Besides possibly having a small low cost fusion reactor, studding the possible gravity and anti-gravity effects could surge mankind's advancement in space exploration and transportation. Having a propulsion system that can possibly produce its own gravity effects while at the same time using anti-gravity effects for propulsion means that a passenger can travel and change directions at extremely high speeds without g-force effects.

The NESAR at a minimum will surpass the break-even point of fusion, because it functions like and exhibits many similar effects that are generated by our own Sun. Once the NESAR is built and fully functional, hopefully this breakthrough in fusion technology will inspire a new generation of theoretical and applied physicists that will stop confusing the practice of sole math and number crunching with true physics. Currently many theoretical physicists are in the bad habit of predicting unprovable theories with a bunch of calculations yielding no possible conceptual devices that could perpetuate their ideas; while many applied physicists have failed in not being innovative and have placed wasted resources in failing projects like the ITER. It is for these reasons that the advancement in technological achievements, besides computing, have come to a relative standstill compared to the first half of the $20^{th}$ century. Many physicists that practice the broken methods of calculating the possible existence of the unprovable, need to refocus their efforts by placing more exertions on mastering our current provable knowledge and built new levels of understanding upon these concepts with the intentions of innovating and advancing the lives of mankind. Physicist must leave the number crunching for computers, and place more investment in the true human gift of having the capacity to dream, learn and innovate. Once refocused upon this human gift we can achieve the impossible and solve common worldwide problems like free energy.

The invention claimed is:

1. A confinement apparatus comprising:
 a plurality of conductive coils, the plurality of conductive coils arranged contiguous with each other comprising:
  a first sub-plurality of conductive coils, each conductive coil of the first sub-plurality of conductive coils having a through-bore therein, each through-bore having a first axis directed to a confined center at the center of the confinement apparatus; and,
  a second sub-plurality of conductive coils, each conductive coil of the second sub-plurality of conductive coils having a through-bore therein, each through-bore of the second sub-plurality of conductive coils having a second axis directed off-center to stimulate rotation of a plurality of particles in a first rotational direction;
 wherein the first sub-plurality of conductive coils are arranged such that at least one of the first axes are arranged to pass through the confined center of the confinement apparatus, and the second sub-plurality of conductive coils are arranged such that at least one of the second axes are arranged to pass off-center while remaining within the confinement apparatus and wherein the confinement apparatus is arranged to rotate via at least one rotor.

2. The confinement apparatus recited in claim 1, wherein at least one of the first sub-plurality of conductive coils and at least one of the second sub-plurality of conductive coils comprise at least one conductive wire encapsulated within a hollow protective casing.

3. The confinement apparatus recited in claim 1, wherein at least one of the first sub-plurality of conductive coils and at least one of the second sub-plurality of conductive coils are fixedly secured to each other via a hollow non-conductive connector.

4. A confinement system comprising:
 a primary chamber having a wall;
 a confinement apparatus, the confinement apparatus comprising:
  a plurality of conductive coils, the plurality of conductive coils arranged contiguous with each other comprising:
   a first sub-plurality of conductive coils, each conductive coil of the first sub-plurality of conductive coils having a through-bore therein, each through-bore having a first axis directed to a confined center at the center of the confinement apparatus; and,
   a second sub-plurality of conductive coils, each conductive coil of the second sub-plurality of conductive coils having a through-bore therein, each through-bore of the second sub-plurality of conductive coils having a second axis directed off-center to stimulate rotation of a plurality of particles in a first rotational direction;
  wherein the first sub-plurality of conductive coils are arranged such that at least one of the first axes are arranged to pass through the confined center of the confinement apparatus, and the second sub-plurality of conductive coils are arranged such that at least one of the second axes are arranged to pass off-center while remaining within the confinement apparatus;
 at least one electron discharger;
 at least one power supply;
 at least one injector arranged to insert a first material;
 a primary non-conductive confinement apparatus support attached to the confinement apparatus, arranged to couple the confinement apparatus to the wall of the primary chamber;
 at least one commutator and a first rotor, the at least one commutator arranged to non-rotationally engage with the primary non-conductive confinement apparatus support, the primary non-conductive confinement apparatus support further arranged to extend through and couple to a first bearing, the at least one commutator and the first rotor, the first bearing arranged to engage with the wall of the primary chamber;
 wherein the primary chamber is arranged to encompass the confinement apparatus, the at least one electron discharger, the at least one injector, and the primary non-conductive confinement apparatus support.

5. The confinement system recited in claim 4, wherein the primary chamber is negatively pressurized by at least one motor.

6. The confinement system recited in claim 4, wherein the first material is selected from a group of: deuterium, tritium, hydrogen, a hydrogen isotope, electrons, ions, neutrons, protons, plasma, or any combination thereof.

7. The confinement system recited in claim 4, wherein the at least one commutator is arranged between the first bearing and the first rotor, and the at least one commutator is arranged to contact at least one brush arranged to transfer a first current from the at least one power supply to the confinement apparatus.

8. The confinement system recited in claim 4, wherein the primary non-conductive confinement apparatus support comprises a first variable emitter, inserted within the primary non-conductive confinement apparatus support that is arranged to insert a second material within the confinement apparatus to assist in perpetuating fusion reactions within the confinement apparatus.

9. The confinement system recited in claim 8, wherein the second material is selected from a group of: deuterium, tritium, hydrogen, a hydrogen isotope, electrons, ions, neutrons, protons, plasma, or any combination thereof.

10. The confinement system recited in claim 4, wherein the confinement apparatus is attached to a secondary non-conductive confinement apparatus support that extends through and couples with a second bearing and a second rotor, the second bearing arranged to engage with the wall of the primary chamber.

11. The confinement system recited in claim 10, wherein the secondary non-conductive confinement apparatus support comprises a second variable emitter, inserted within the secondary non-conductive confinement apparatus support that is arranged to insert a second material to assist in perpetuating fusion reactions within the confinement apparatus.

12. The confinement system recited in claim 4, wherein the primary chamber further comprises a secondary chamber and a tertiary chamber, the secondary and tertiary chambers being sealed and attached to an exterior of the primary chamber where the secondary chamber encompasses the first bearing, the first rotor, the primary non-conductive confinement apparatus support, the at least one commutator, the at least one brush and the first variable emitter, while the tertiary chamber encapsulates the second bearing, the second rotor, the secondary non-conductive confinement apparatus support and the second variable emitter.

13. The confinement system recited in claim 12, wherein the secondary chamber is encompassed by a first stator and the tertiary chamber is encompassed by a second stator, with the first stator and the second stator are energized by at least one second current from the at least one power supply that causes the confinement apparatus to rotate in a second rotational direction that is opposite to the first rotational direction.

14. The confinement system recited in claim 4, wherein the electron discharger encompasses he confinement apparatus and is attached and supported by at least one non-conductive electron discharger support that is sealed and also attached to the wall of the primary chamber, with a third current from the at least one power supply connected to the electron discharger from within at least one non-conductive electron discharger support.

15. The confinement system recited in claim 14, wherein a voltage associated with the third current to the electron discharger is higher than a voltage associated with a first current to the confinement apparatus, resulting in a cathode and anode relationship between the electron discharger and the confinement apparatus which accelerates excess electrons within the primary chamber inward towards the confinement apparatus which further confines the accelerated electrons to create a rotating negative potential well that rotates about the confined center.

16. The confinement system recited in claim 15, wherein the rotating negative potential well will accelerate positive ions towards the rotating negative potential well when the first material is inserted for ionization within the primary chamber from the at least one injector.

17. The confinement system recited in claim 4, wherein the at least one injector is encompassed by and attached to the wall of the primary chamber, the at least one injector extending towards the confined center and terminating between the confinement apparatus and the electron discharger.

18. The confinement apparatus of claim 1, wherein the confinement apparatus is configured to rotate in a second rotational direction opposite the first rotational direction.

* * * * *